United States Patent [19]

Dust et al.

[11] Patent Number: 4,906,541
[45] Date of Patent: Mar. 6, 1990

[54] ELECTROPHOTOGRAPHIC RECORDING ELEMENT CONTAINING A NAPHTHOLACTAM DYE SENSITIZER

[75] Inventors: Matthias Dust, Ludwigshafen; Peter Neumann, Mannheim; Reinhold J. Leyrer, Ludwigshafen, all of Fed. Rep. of Germany

[73] Assignee: BASF Aktiengesellschaft, Ludwigshafen, Fed. Rep. of Germany

[21] Appl. No.: 274,970

[22] Filed: Nov. 22, 1988

[30] Foreign Application Priority Data

Nov. 28, 1987 [DE] Fed. Rep. of Germany ....... 3740421

[51] Int. Cl.$^4$ .................... G03G 13/32; G03G 31/26
[52] U.S. Cl. ........................................ 430/49; 430/83; 430/95; 430/945
[58] Field of Search ................. 430/49, 83, 95, 126, 430/945

[56] References Cited

U.S. PATENT DOCUMENTS

| | | | |
|---|---|---|---|
| 3,041,165 | 6/1962 | Sus et al. | 430/73 |
| 3,180,729 | 4/1965 | Walter et al. | 430/73 |
| 3,257,203 | 6/1966 | Sus et al. | 430/73 |
| 3,347,865 | 10/1967 | Brack | 260/213 |
| 3,871,881 | 3/1975 | Mikelsons | 430/69 |
| 3,975,197 | 8/1976 | Mikelsons | 430/69 |
| 4,003,898 | 1/1977 | Gomm | 260/247.1 |
| 4,115,116 | 9/1978 | Stolka et al. | 430/59 |
| 4,150,987 | 4/1979 | Anderson et al. | 430/59 |
| 4,278,747 | 7/1981 | Murayama et al. | 430/82 |
| 4,367,273 | 1/1983 | Murayama et al. | 430/56 |
| 4,424,266 | 1/1984 | Kurihara et al. | 430/59 |
| 4,529,678 | 7/1985 | Ohta | 430/58 |
| 4,710,446 | 12/1987 | Hoffmann | 430/281 |
| 4,714,779 | 12/1987 | Turner et al. | 564/330 |
| 4,743,521 | 5/1988 | Hoffmann | 430/56 |
| 4,756,987 | 7/1988 | Maeda et al. | 430/270 |

FOREIGN PATENT DOCUMENTS

| | | |
|---|---|---|
| 545993 | 8/1985 | Australia . |
| 1023188 | 12/1977 | Canada . |
| 1146794 | 5/1983 | Canada . |
| 0131292 | 3/1989 | European Pat. Off. . |
| 0156308 | 3/1989 | European Pat. Off. . |
| 0162216 | 3/1989 | European Pat. Off. . |
| 0150419 | 12/1989 | European Pat. Off. . |
| 1058836 | 6/1959 | Fed. Rep. of Germany . |
| 1060260 | 6/1959 | Fed. Rep. of Germany . |
| 1106599 | 12/1961 | Fed. Rep. of Germany . |
| 1569660 | 9/1966 | Fed. Rep. of Germany . |
| 3608214 | 3/1989 | Fed. Rep. of Germany . |
| 3631843 | 3/1989 | Fed. Rep. of Germany . |
| 3738911 | 3/1989 | Fed. Rep. of Germany . |
| 72-24244 | 5/1972 | Japan . |
| 2088074 | 6/1982 | United Kingdom . |

*Primary Examiner*—John L. Goodrow
*Attorney, Agent, or Firm*—Keil & Weinkauf

[57] ABSTRACT

An electrophotographic recording element comprising
(A) an electrically conducting base and
(B) at least one photoconductive layer consisting essentially of
  ($b_1$) at least one binder,
  ($b_2$) at least one sensitizer which on exposure of layer (B) generates charge carriers and which is selected from the group of the naphtholactam dyes of the general structure I

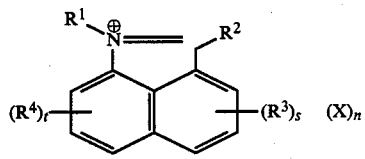

where the indices and variables have specified meanings,
  ($b_3$) at least one photoconductor which transports the generated charge carriers and optionally
  ($b_4$) additives, and also novel naphtholactam dyes of the general formula I where $R^2$ is substituted monocyclic 1,3-thiazolyl bonded to the naphtholactam structure via a carbon ring atom, the use of these novel naphtholactams I in electrophotographic and laser-optical recording elements and also novel reprographic processes and novel processes for producing offset printing plates and photoresists using the novel electrophotographic recording element.

19 Claims, No Drawings

ELECTROPHOTOGRAPHIC RECORDING ELEMENT CONTAINING A NAPHTHOLACTAM DYE SENSITIZER

The present invention relates to a novel electrophotographic recording element comprising
(A) an electrically conducting base and
(B) at least one photoconductive layer consisting essentially of
(b$_1$) at least one binder,
(b$_2$) at least one sensitizer which on exposure of layer (B) generates charge carriers,
(b$_3$) at least one photoconductor which transports the generated charge carriers and optionally
(b$_4$) additives.

As is known, such a recording element, besides base (A) and layer or layers (B), may contain further layers which are useful to the functioning of the recording element. Moreover, not only in an existing recording element but also in the novel recording element the charge carrier generator compounds or sensitizers (b$_2$) may be present as a separate layer or in a separate layer besides a layer of binders (b$_1$), charge carrier transporter compounds (b$_3$) and any additives (b$_4$), in which case this double layer must then be regarded as a whole in terms of its function as a layer (B). Layers (B) of this kind as well as those which contain all components (b$_1$), (b$_2$), (b$_3$) and optionally (b$_4$) together are therefore referred to hereinafter in keeping with their function as photoconductive layer (B) for short.

Electrophotographic recording elements incorporating an electrically conducting base (A) and photoconductive layers (B) are known for example from EP-A-0,131,215, EP-B-0,031,481, EP-A-0,150,419, EP-A-0,162,216, EP-A-0,156,308, EP-A-0,131,292, EP-A-0,152,889 or EP-A-0,198,488. These recording elements are used to produce offset printing plates or printed circuits (circuit boards) or in photocopying.

To this end, the photoconductive layer (B) of a recording element is charged electrically positive or negative, for example by means of a corona discharge. Thereafter the electrically charged photoconductive layer (B) is subjected to imagewise exposure with actinic light which, depending on the sensitizer (b$_2$) used, will be ultraviolet, Visible or infrared light. As a result of exposure, the photoconductive layer (B) becomes electrically conducting in its exposed areas, so that the previously generated electrostatic charge can drain away in these areas via the electrically conducting base (A). This gives a latent electrostatic image on the recording element, which can be developed by means of suitable liquid or solid toners into a visible image. This technique of imagewise information recording is generally referred to as xerography, although the physical process underlying the recording process is also known under the name Carlson process.

After the electrostatic image has been tonered, such a recording element can be further processed in different ways. For example, the toner image can be transferred from the recording element to another base, for example paper, and be fixed thereon to obtain a positive photocopy of the original. This procedure can be carried out more or less often, depending on the life of the recording element. To produce offset printing plates, by contrast, the toner image is fixed on the photoconductive layer (B) itself by heating. Thereafter the unexposed and therefore toner-free areas of the photoconductive layer (B) are dissolved away by means of suitable liquid media, which are also referred to as developers. An offset printing plate produced in this way, like a conventionally produced offset printing plate, generally accepts oily printing ink in its hydrophobic toner image areas and water in its cleared, hydrophilic areas, so that it is suitable for offset-type printing processes. To produce photoresists, use is made of processes which correspond to the manufacturing process for offset printing plates.

Parameters which are known to have a significant effect on the reproduction quality of such recording elements and of their photoconductive layers (B) are the dark conductivity, which should ideally be low, the electrostatic chargeability, which should be high, and the sensitivity to actinic light, which should be high, combined with good electrokinetic properties, meaning in general a very rapid voltage drop on exposure down to or almost down to the original electrostatic potential before charging. This voltage drop is also referred to as the photo-induced voltage drop or photodrop for short. All these parameters together determine in advance whether or not a recording element will be capable of delivering high-contrast toner images which are true to the original down to their finest image elements within a very short time.

In the matter of mutually adapting the significant parameters to one another and to the actinic light source used for the imagewise exposure of photoconductive layer (B), the charge carrier generator compounds or sensitizers (b$_2$) play a very decisive part. The always great importance of sensitizers (b$_2$) has been increased even more by the further development of conventional exposure light sources and the new development of laser light sources. Progress in this field has in the meantime led to exposure units which permit the rapid and exact imagewise exposure of electrophotographic recording elements by means of computer-controlled lasers. For economic reasons and because they are simple to manufacture, the lasers used are frequently semiconductor lasers, for example GaAlAs semiconductor lasers, which emit infrared light, or AlGaInP semiconductor lasers, which emit visible light. To be able to utilize in full the advantages of this promising method of exposure it is however necessary to assume that the electrophotographic recording elements have a range of properties which is not offered at all or not to a sufficient extent by conventional recording elements. More particularly, owing to the short laser pulses and the comparatively low photon energy in the red and infrared region, the absorption of the light energy by the photoconductive layer (B) and the consequent photodrop must take place particularly rapidly, i.e. within the nanosecond range, and in this time interval too the law $$I.t = \text{constant}$$

(I = Light intensity; t = time)

must be valid.

Yet these strict requirements have hitherto not been met or met to the desired extent by existing electrophotographic recording elements containing as sensitizers one or more dyes of the classes of the triarylmethanes, xanthenes, cyanines, azo dyes, phthalocyanines, isoindolines or perylenetetracarboxylic acid derivatives. Consequently, in order to obtain good-quality reproduction, it is frequently necessary to expose existing recording elements in a conventional manner and hence forgo the particular advantages of the laser light exposure method, in particular those flowing from the use of semiconductor lasers. Accordingly, existing recording elements are not or only to a very limited extent suitable for the manufacture of economical long-life fast-response laser light photocopiers or for the production of high-quality faithful offset printing plates having a long press life or of high-quality faithful photoresists having resistant to agents used for etching by the laser light exposure method. These disadvantages do of course become fully manifest in the products which in the final analysis are to be produced by means of laser light exposure from the electrophotographic recording elements; for instance, the photocopies in question or the printed copies are obtained not only in lesser quality but also in a comparatively short run, and electric circuits produced using existing electrophotographic resists frequently show so many errors of reproduction that they do not meet practical requirements.

It is an object of the present invention to find new dyes and new electrophotographic recording elements which no longer have the disadvantages of existing dyes and recording elements. More particularly, the new recording elements not only shall have an excellent reprographic range of properties on imagewise exposure with ultraviolet or visible light but they shall also be accessible to imagewise exposure with red or infrared light, in particular with red or infrared laser light, and thereby give excellent photocopies, offset printing plates and photoresists.

We have found that is object is achieved with an electrophotographic recording element comprising
  (A) an electrically conducting base and
  (B) at least one layer consisting essentially of
    ($b_1$) at least one binder,
    ($b_2$) at least one sensitizer which on exposure of layer (B) generates charge carriers,
    ($b_3$) at least one photoconductor which transports the generated charge carriers and optionally
    ($b_4$) additives,
at least one of the sensitizers ($b_2$) of the novel recording element being selected from the group of the naphtholactam dyes of the general structure I $$\underset{(R^4)_r}{\overset{R^1}{\underset{|}{N}}}\overset{\oplus}{=} \cdots R^2 \quad (R^3)_s \quad (X)_n \qquad I$$

where the indices and variables are defined as follows:
  $R^1$ is $C_1$–$C_{22}$-alkyl, $C_5$–$C_7$-cycloalkyl, $\omega$-aryl-$C_1$–$C_6$-alkyl, aryl or $C_3$–$C_{15}$-alkylene, or
  $R^1$ is halogen-, hydroxyl-, amino-, thiolo-, cyano-, oxo-, alkyloxy-, cycloalkyloxy-, aryloxy-, arylalkyloxy-, alkylamino-, cycloalkylamino-, arylamino-, arylalkylamino-, alkanecarbonyloxy-, cycloalkanecarbonyloxy-, arylalkanecarbonyloxy-, aromatocarbonyloxy-, alkanecarbonylamino-, cycloalkanecarbonylamino-, arylalkanecarbonylamino-, aromatocarbonylamino, alkylideneimino-, cycloalkylideneimino-, arylalkylideneimino-, carboxyl-, phosphono- and/or sulfo-substituted $C_1$–$C_{22}$-alkyl, $C_5$–$C_7$-cycloalkyl, $\omega$-aryl-$C_1$–$C_6$-alkyl, aryl or $C_3$–$C_{15}$-alkylene, or $R^1$ is a radical of the general structure II $$R^5 \text{--} (\text{O--}(CH_2)_m)_p \qquad II$$

where $R^5$ is hydrogen, $C_1$–$C_6$-alkyl or $C_6$–$C_{10}$-aryl, m is an integer from 2 to 4 and independently thereof p is an integer from 1 to 10,
  $R^2$ is a radical of the general structure III $$-Q-N\!\!\begin{array}{c}R^6\\R^7\end{array} \qquad III$$

where $R^6$ and $R^7$ are identical to or different from each other and are each hydrogen, $R^1$ or alkyl alkan-1-yl-$\omega$-carboxylate and where Q is 1,4-phenylene, 2-alkyl-1,4-phenylene or 1,4-naphthylene, or
  $R^2$ is a radical of the general formula IV $$-Q-R^8 \qquad IV$$

where $R^8$ is a substituted or unsubstituted, monocyclic or fused heterocycle from the class of the azoles, azolines, azolidines, partially or completely hydrogenated azoles and partially or completely hydrogenated azepines which is bonded to Q via a nitrogen ring atom and where Q is as defined for the general formula III, or
  $R^2$ is a substituted or unsubstituted, monocyclic or fused heterocycle from the class of the azoles, azolines, partially hydrogenated azines and azines which is bonded to the naphtholactam structure via a carbon ring atom, or
  $R^2$ is a radical of the general structure V $$-CH=C\underset{R^9}{\overset{R^{10}}{|}}(C=C)_q\underset{R^{11}}{\overset{R^{12}}{|}}C=C\underset{R^{13}}{\overset{}{|}}R^{14} \qquad V$$

where the indices and variables are defined as follows:
  q is 0 or 1,
  r is independently of q 0, 1 or 2,
  $R^9$ are each hydrogen or, if q is 1, together an unsubstituted or $C_1$–$C_4$-alkyl-substituted $C_2$–$C_3$-alkanediyl chain or one or two carbonyl groups,
  $R^{10}$, are each hydrogen, halogen, cyano, nitro, hydroxyl,
  $R^{12}$ and $R^{13}$ $R^1$, $C_1$–$C_6$-alkoxy, $C_5$–$C_7$-cycloalkoxy, $C_6$–$C_{10}$ aryloxy, $\omega$-phenyl-$C_1$–$C_6$-alkyloxy, $C_1$–$C_6$-alkoxycarbonyl, $C_5$–$C_7$-cycloalkoxycarbonyl, $C_6$–$C_{10}$-aryloxycarbonyl, $\omega$-phenyl-$C_1$–$C_6$-alkoxycarbonyl, $C_1$–$C_6$-alkylaminocarbonyl, $C_5$–$C_7$-cycloalkylaminocarbonyl, $C_6$–$C_{10}$-arylaminocarbonyl, $\omega$-phenyl-$C_1$–$C_6$-alkylaminocarbonyl or a substituted or unsubstituted, monocyclic or fused heterocycle from the class of the azoles, thiols, azolines, azines and partially or completely hydrogenated azines, $R^{10}$, $R^{12}$ and $R^{13}$ being identical or different from one another,
  $R^{14}$ is $R^2$ of the general structure III,
  $R^{14}$ is $R^2$ of the general structure IV, or
  $R^{14}$ is a substituted or unsubstituted, monocyclic or fused heterocycle from the class of the azoles, thiols, azolines, azolidines, azines, partially or completely hydrogenated azines and thiines which is bonded structure to the radical of the general formula V via a carbon ring atom, or
  $R^{14}$ is a radical of the general structure VI

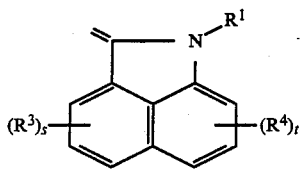

where $R^1$ is as defined above and where $R^3$, $R^4$, s and t are each as defined below, or $R^2$ is a radical of the general structure VII

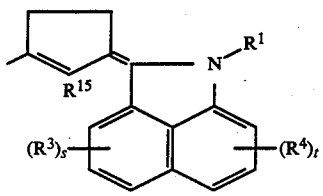

where $R^1$ is as defined above, $R^3$, $R^4$, s and t are each as defined below and where $R^{15}$ is the radical of an acidic CH compound, s is 1, 2 or 3, t is independently of s 1, 2 or 3, $R^3$ and $R^4$ are each $R^{10}$, $R^{12}$, $R^{13}$, $R^1$, carboxyl, sulfo, phosphono, $C_1$–$C_6$-alkyl-, $C_5$–$C_{10}$-cycloalkyl-, $C_6$–$C_{10}$-aryl- or ω-phenyl-$C_1$–$C_6$-alkyl-thio, -oxysulfonyl, -sulfonyl or -oxycarbonylaminyl, N,N-dialkyl-, N,N-diaryl-, N-alkyl-N-aryl-, N,N-di-(ω-arylalkyl)-, N-alkyl-N-(ω-arylalkyl)-, N-aryl-N-(ω-arylalkyl)-, N,N-dicycloalkyl-, N-cycloalkyl-N-alkyl-, N-cycloalkyl-N-aryl- or N-cycloalkyl-N-(ω-arylalkyl)-amino, -aminosulfonyl or -aminocarbonyl or if s=2 or 3, t=2 or 3 or s and t=1, 2 or 3 a carbon, nitrogen, oxygen or sulfur atom which is part of the structure of one or more rings fused to the naphth-1,8-ylene group, $R^3$ and $R^4$ being identical to or different from each other, X is an anion, and n is 0 or ⅓, ½, ⅔, 1, 2 or 3.

We have also found novel naphtholactam dyes of the general formula I where the variables $R^1$, $R^3$, $R^4$ and X and the indices t, s and n are as defined above and where $R^2$ is substituted monocyclic 1,3-thiazolyl bonded to the naphtholactam structure via a carbon ring atom.

An essential constituent of the electrophotographic recording element according to the invention is the novel photoconductive layer (B).

The novel photoconductive layer (B) contains one or more binders ($b_1$), one or more charge carrier generator compounds or sensitizers ($b_2$) and one or more charge carrier transporter compounds or photoconductors ($b_3$) side by side together.

Or the novel photoconductive layer (B) contains the sensitizer(s) in a separate layer or as a separate layer, so that the novel photoconductive layer (B) is a double layer.

Which novel photoconductive layer (B0 is chosen for constructing the recording elements according to the invention depends first and foremost on the intended use of the recording elements.

The essential constituent of the novel photoconductive layer (B) is the sensitizer ($b_2$). It is a naphtholactam dye of the general formula I where the indices and variables are as defined in the claim.

Examples of suitable radicals $R^1$ in the general structure I are methyl, ethyl, propyl, butyl, pentyl, isopropyl, isobutyl, sec-butyl, tert-butyl, hexyl, heptyl, octyl, nonadecyl, icosanyl, henicosanyl, docasanyl, cyclopentyl, cyclohexyl, 2-, 3-, or 4-methylcyclohexyl, cyclopentyl, 2,3-, 2,4-, 2,5- or 3,4-dimethylcyclopentyl, phenylmethyl, 2-phenyl-eth-1-yl, 2-(1'-naphthyl)-eth-1-yl, 3-phenyl-prop-1-yl, 3-(4'-methylphen-1'-yl)-prop-1-yl, 4-phenyl-but-1-yl, 5-phenyl-pent-1-yl, 6-phenyl-hex-1-yl, phenyl, 4-methylphen-1-yl, naphthalen-1-yl, anthracen-1-yl, phenanthren-1-yl, prop-2-en-1-yl, but-3-en-1-yl, pent-4-en-1-yl, hex-5-en-1-yl, hept-6-en-1-yl, oct-7-en-1-yl, non-8-en-1-yl, dec-9-en-1-yl, undec-10-en-1-yl, dodec-11-en-1-yl, pentadec-14-en-1-yl, trifluoromethyl, 2,2,2-trifluoroeth-1-yl, perfluoroprop-1-yl, 2-chloroeth-1-yl, 3-chlorobut-1-yl, 4-chlorocyclohex-1-yl, 2- or 4-chlorophen-1-yl, 4-trifluoromethylphen-1-yl, 2,4-dichlorophen-1-yl, 4'-chlorophenylmethyl, 2-(4'-chlorophen-1'-yl)-eth-1-yl, 4-chloro-hex-5-en-1-yl, 2-hydroxyeth-1-yl, 2-hydroxyprop-1-yl, 3-hydroxyprop-1-yl, 2-hydroxybut-1-yl, 2,3-dihydroxy-prop-1-yl, 8-hydroxyoct-1-yl, 9-hydroxydec-1-yl, 2-hydroxycyclopent-1-yl, 4-hydroxycyclo-hex-1-yl, 4'-hydroxyphenylmethyl, 2-(4'-hydroxyphen-1'-yl)-eth-1-yl, 3-(4'-hydroxyphen-1'-yl)-eth-1-yl), 4-hydroxyphen-1-yl, 2,4-dihydroxyphen-1-yl, 4-hydroxy-naphth-1-yl, 3-hydroxypent-5-en-1-yl, 2-aminoeth-1-yl, 3-aminoprop-1-yl, 4-aminobut-1-yl, 5-aminopent-1-yl, 6-aminohex-1-yl, 2-aminocyclopent-1-yl, 4-aminocyclohex-1-yl, 4-aminophenylmethyl, 2-(4'-aminophen-1'-yl)-eth-1-yl, 3-(4'-aminophen-1'-yl)-prop-1-yl, 2-aminophenyl, 4-aminophenyl, 3-aminohex-5-en-1-yl, 4-thiolobut-1-yl, 4-thiolocyclohex-1-yl, 2-(4'-thiolophen-1'-yl)-eth-1-yl, 4-thiolophen-1-yl, 5-thiolodec-9-en-1-yl, cyanomethyl, 2-cyanoeth-1-yl, 3-cyanoprop-1-yl, 4-cyanobut-1-yl, 5-cyanopent-1-yl, 6-cyanohex-1-yl, 11-cyanoundec-1-yl, 12-cyanododec-1-yl, 13-cyanotridec-1-yl, 17-cyanoheptadec-1-yl, 18-cyanooctadec-1-yl, 4-cyanocyclohex-1-yl, 4-cyanophenylmethyl, 2-(4'-cyanophen-1'-yl)-eth-1-yl, 3-(4'-cyanophen-1'-yl)-prop-1-yl, 4-cyanophen-1-yl, 4-chloro-2-cyano-phen-1-yl, 2,4-dicyanophen-1-yl, 3,3-dicyanoprop-2-en-1-yl, 1-oxo-eth-1-yl, 1-oxoprop-1-yl, 2-oxo-prop-1-yl, 2-oxo-eth-1-yl, 3-oxo-but-1-yl, 7-oxo-dec-1-yl, 4,6-dimethyl-3,5-dioxohex-1-yl, 2-oxo-3-(4'-hydroxyphen-1'-yl)-prop-1-yl, 2-oxo-3-(4'-trifluorophen-1'-yl)-prop-1-yl, 2-methoxyeth-1-yl, ethoxymethyl, 2-methoxyprop-1-yl, 4-methoxybut-1-yl, 6-methoxyhex-1-yl, 7-ethoxyhept-1-yl, 2,4,7-trimethoxydec-1-yl, 6-ethyl-4-oxadec-1-yl, 20-ethoxyicosan-1-yl, 2-butoxyeth-1-yl, 2-benzyloxy-eth-1-yl, 3-methoxycyclopentyl, 3,4-dimethoxycyclopentyl, 4-methoxycyclohexyl, cyclohexyloxymethyl, 2-phenyloxy-eth-1-yl, 3-phenyloxyprop-1-yl, 10-phenyloxy-dec-1-yl, (4'-methoxy-phen-1'-yl)-methyl, 2-(4'-methoxy-phen-1'-yl)-eth-1-yl, 3-(3',4',4'-trimethoxyphen-1'-yl)-prop-1-yl, 2-[4'-(phenyloxy)phen-1'-yl]-eth-1-yl, 2- or 4-methoxyphen-1-yl, 4-ethoxyphen-1-yl, 2,4-dimethoxy-phen-1-yl, 4-nonyloxy-phen-1-yl, 4-undecyloxy-phen-1-yl, 4-dodecyloxy-phen-1-yl, 4-hexadecyloxy-phen-1-yl, 4-octadecyloxy-phen-1-yl, 3-octadecyloxy-phen-1-yl, 4-icosanyloxyphen-1-yl, 2,3,6,7-tetramethoxynaphth-1-yl, 4-(4'-methylphenyloxy)-phen-1-yl, 4-[4'-(4''-phenyloxy)phen-1'-yl]-phen-1-yl, N,N-dimethylaminomethyl, 3-azapent-1-yl, 5-amino-3-azapent-1-yl, 5-N,N-dihexylamino-3-azapent-1-yl, 7-azapentacosan-1-yl, 3,6-diazaoct-1-yl, 4-N,N-dioctylamino-but-1-yl, 6-N,N- dioctadecylamino-hex-1-yl, 18-N,N-dimethylamino-octadec-1-yl, 2-N-phenylaminoeth-1-yl, 3-(4'-N,N-dimethylaminophenylamino)-prop-1-yl, 4-N,N-dimethylaminocyclohex-1-yl, 6-N-benzylaminohex-1-yl, 4-N,N-dimethylaminophen-1-yl, 4-N-methyl-N-octadecylamino-phen-1-yl, 4-N-phenylaminophen-1-yl, 4-N-benzylaminophen-1-yl, 3-N,N-dimethylaminohex-5-en-1-yl, methanecarbonyloxymethyl, 2-(methanecarbonyloxy)-eth-1-yl, 2-(ethanecarbonyloxy)-eth-1-yl, 2-(propanecarbonyloxy)-eth-1-yl, 3-(butanecarbonyloxy)prop-1-yl, 6-(cyclohexanecarbonyloxy)-hex-1-yl, 4-(methanecarbonyloxy)-cyclohex-1-yl, 12-(benzenecarbonyloxy)dec-1-yl, 4-(benzenecarbonyloxy)-benzyl, 2-[4'-(methanecarbonyloxy)-phen-1'-yl]-eth-1-yl, 3-[4'-(propanecarbonyloxy)-phen-1'-yl]-prop-1-yl, 4-(methanecarbonyloxy)-phen-1yl, 4-(ethanecarbonyloxy)-naphth-1-yl, 4-(heptadecanecarbonyloxy)-phen-1-yl, 4-(cyclohexanecarbonyloxy)-phen-1-yl, 5-(methanecarbonyl-oxy)-oct-7-en-1-yl, methanecarbonylaminomethyl, 2-(methanecarbonylamino)-eth-1-yl, 3-(butanecarbonylamino)-prop-1-yl, 8-(cyclohexanecarbonylamino)-oct-1-yl, 2-(benzenecarbonylamino)-eth-1-yl, 4-(phenylmethanecarbonylamino)-cyclohex-1-yl, 2-[4'-methanecarbonylamino)-phen-1'-yl]-eth-1-yl, 4-(methanecarbonylamino)-phen-1-yl, 4-(benzenecarbonylamino)-phen-1-yl, 4-(heptadecanecarbonylamino)-phen-1-yl, 4-azahex-4-en-1-yl, 2-(cyclohexylideneimino)-eth-1-yl, 2-(benzylideneimino)-eth-1-yl, 4-(cyclohexylideneimino)-cyclohex-1-yl, 4-(benzylideneimiho)-phen-1-yl, 2-[4'-(benzylideneimino)-phen-1'-yl]-eth-1-yl, 2-carboxy-eth-1-yl, 3-carboxy-prop-1-yl, 4-carboxy-hex-1-yl, 17-carboxy-hepta-dec-1-yl, 5,6-dicarboxy-hex-1-yl, 2-carboxy-cyclopent-1-yl, 4-carboxycyclohex-1-yl, 2-(4'-carboxy-phen-1'-yl)-eth-1-yl, 3-(3'-hydroxy-4'-carboxy-phen-1'-yl)-prop-1-yl, 4-carboxy-phen-1-yl, 3,4-dicarboxy-phen-1-yl, 6,7-dicarboxy-naphth-1-yl, 4-carboxy-hex-5-en-1-yl, eth-1-yl-2-sulfonic acid, prop-1-yl-3-sulfonic acid, but-1-yl-4-sulfonic acid, dodec-1-yl-12-sulfonic acid, tetradec-1-yl-14-sulfonic acid, hexadec-1-yl-16-sulfonic acid, octadec-1-yl-13-sulfonic acid, cyclohex-1-yl-4-sulfonic acid, 8-(phen-1'-yl-4'-sulfo)oct-1-yl, phen-1-yl-4-sulfonic acid, phen-1-yl-3,4-disulfonic acid, naphth-1-yl-2-sulfonic acid, naphth-1-yl-2,6-disulfonic acid, naphth-1-yl-6,7-disulfonic acid, but-3-en-1-yl-2-sulfonic acid, eth-1-yl-2-phosphonic acid, cyclohex-1-yl-4-phosphonic acid, phen-1-yl-4-phosphonic acid, 3-oxa-5-hydroxypent-1-yl, 3,6-dioxa-hept-1-yl, 3,6-dioxa-oct-1-yl, 3,6-dioxa-dec-1-yl, 3,6-dioxa-dodec-1-yl, 3,6-dioxa-6-phenyl-hex-1-yl, 3,6-dioxa-7-phenyl-hept-1-yl, 3,6,9-trioxa-dec-1-yl,3,6,9-trioxa-undec-1-yl, 3,6,9-trioxatridec-1-yl, 3,6,9-trioxa-10-phenyl-dec-1-yl, 8-hydroxy-3,6-dioxa-oct-1-yl, 8-(phenyloxy)-3,6-dioxa-oct-1-yl, 3,6,9,12,15-pentaoxa-hexadec-1-yl, 4,8-dioxa-undec-1-yl, 4-oxa-8-hydroxy-oct-1-yl, 4,8,12-trioxa-tridec-1-yl, 4,8,12-trioxa-octadec-1-yl or 4,8,12,16-tetraoxa-heptadec-1-yl.

Examples of particularly advantageous radicals $R^1$ in naphtholactam dyes of the general structure I are methyl, ethyl, hexyl, dodecyl, docosanyl, phenylmethyl, 2-butoxy-eth-1-yl (=3-oxahept-1-yl), 3,6-dioxahept-1-yl, 3,6-dioxaoct-1-yl, 3,6-dioxadec-1-yl, 3,6-dioxadodec-1-yl, 3,6,9-trioxa-dec-1-yl, 3,6,9-trioxatridec-1-yl and undec-10-en-1-yl.

Examples of suitable radicals $R^6$ and $R^7$ in radicals $R^2$ of the general structure III are the aforementioned radicals $R^{1,}$ of which methyl, ethyl, propyl, butyl, pentyl, hexyl, isopropyl, isobutyl, sec-butyl, tert-butyl, 2-chloroeth-1-yl, 2-hydroxyeth-1-yl, 2-hydroxyprop-1-yl, 2-hydroxybut-1-yl, 4-chlorophen-1-yl, 2-chlorophen-1-yl, 2-methylphen-1-yl, 4-methylphen-1-yl, 2-cyanoeth-1-yl, 2-methoxyphen-1-yl, 4-methoxyphen-1-yl, 2-(methanecarbonyloxy)-eth-1-yl, 2-(ethanecarbonyloxy)-eth-1-yl, 2-(propanecarbonyloxy)-eth-1-yl, 2-(butanecarbonyloxy)-eth-1-yl, prop-2-en-1-yl, but-3-en-1-yl, pent-1-en-4-yl, hex-5-en-1-yl, hept-6-en-1-yl, oct-7-en-1-yl, non-8-en-1-yl, dec-9-en-1-yl, or undec-10-en-1-yl, are preferred, or hydrogen or methyl, ethyl, propyl or butyl eth-1-yl-2-carboxylates. Of all these, it is in turn hydrogen, methyl, ethyl, butyl, phenyl or 4-ethoxy-phen-1-yl which are very particularly preferred.

Examples of suitable groups Q in radicals $R^2$ of the general structures III and IV are 1,4-phenylene, 2-methylphen-1,4-ylene, 2-ethylphen-1,4-ylene and 1,4-naphthylene, of which 1,4-phenylene is very particularly preferred.

Examples of suitable radicals $R^8$ in radicals $R^2$ of the general structure IV are pyrrol-1-yl, imidazol-1-yl, pyrazol-1-yl, indol-1-yl, 1H-indazol-1-yl, purin-7-yl, carbazol-9-yl, β-carbolin-9-yl, $\Delta^2$- or $\Delta^3$-pyrrolin-1-yl, $\Delta^2$-, $\Delta^3$- or $\Delta^4$-pyrazolin-1-yl, $\Delta^2$-, $\Delta^3$ or $\Delta^4$-imidazolin-1-yl, indolin-1-yl, isoindolin-1-yl, $\Delta^2$-3-methylpyrazolin-1-yl, $\Delta^2$-3,5,5-trimethylpyrazolin-1-yl, $\Delta^2$-3-methyl-5-phenylpyrazolin-1-yl, $\Delta^2$-3,5-diphenylpyrazolin-1-yl, pyrrolidin-1-yl, imidazolidin-1-yl, pyrazolidin-1-yl, 1,2-oxazolidin-1-yl, 1,2-thiazolidin-1-yl, 1-piperidino, morpholin-4-yl, piperazin-1-yl, 4-methylpiperazin-1-yl, phenoxazin-10-yl, phenothiazin-10-yl, perimidin-1-yl, perhydrophenazin-5-yl, $\Delta^3$, $\Delta^5$-1,3-diazepin-1-yl and perhydro-1,3-diazepin-1-yl. Of these it is in turn pyrrolidin-1-yl, 1-piperidino, morpholin-1-yl, 4-methylpiperazin-1-yl, pyrazolidin-1-yl, $\Delta^2$-3-methylpyrazolin-1-yl, $\Delta^2$-3,5,5-trimethylpyrazolin-1-yl, $\Delta^2$-3-methyl-5-phenylpyrazolin-1-yl, and $\Delta^2$-3,5-di-phenylpyrazolin-1-yl which are very particularly preferred.

Examples of particularly advantageous radicals $R^2$ in the general structures III and IV are accordingly 4-N,N-dimethylamino-, 4-N,N-diethylamino-, 4-N,N-dibutylamino-, 4-N-ethyl-N-methylamino-, 4-N-phenylamino-, 4-N,N-diphenylamino-and 4-[N-(4'-ethoxyphen-1'-yl)-N-methylamino]-phen-1-yl and 4-(pyrrolidin-1'-yl)-, 4-(1'-piperidino)-, 4-(morpholin-1'-yl)-, 4-(4'-methylpiperazin-1'-yl)-, 4-(pyrazolidin-1'-yl)-, 4-($\Delta^2$-3'-methylpyrazolin-1'-yl)-, 4-($\Delta^{2'}$-3',5',5'-trimethylpyrazolin-1'-yl)-, 4-($\Delta^{2'}$-3'-methyl-5'-phenyl-pyrazolin-1'-yl)- and 4-($\Delta^{2'}$-3',5'-diphenylpyrazolin-1'-yl)-phen-1-yl.

Examples of suitable radicals $R^2$ in the general structure I which are each a substituted or unsubstituted, monocyclic or fused heterocycle from the class of the azoles, azolines, partially hydrogenated azines and azines which is bonded to the naptholactam structure via a carbon ring atom are N-methyl-pyrrol-2-yl, N-ethyl-3-phenylpyrrol-2-yl, N-methyl-4-phenyl-imidazol-2-yl, N-phenyl-3,5,5-trimethyl-pyrazol-1-yl, 5-methyl-2-phenyl-1,3-oxazol-4-yl, 4-N,N-dimethylamino-1,3-oxazol-2-yl, 5-N,N-diethylamino-1,3,4-oxadiazol-2-yl, 5-N,N-diphenylamino-1,3,4-oxadiazol-2-yl, 4-phenyl-1,3-thiazol-5-yl, 4-phenyl-2-N,N-dimethylamino-1,3-thiazol-5-yl, 4-phenyl-2-N,N-diethylamino-1,3-thiazol-5-yl , 4-phenyl-1,3-thiazol-2-yl, 2-phenyl-1,3-thiazol-4-yl, 2,4-diphenyl-1,3-thiazol-5-yl, 4-(naphth-1'-yl)-1,3-thiazol-5-yl, 4-(4'-methylphen-1'-yl)-2-N,N-dimethylamino-, 2-N,N-diethylamino-, -2-N-ethyl-N-phenylamino-N and -2-N,N-diphenylamino-1,3-thiazol-5-yl, 4-(naphth-1'-yl)-2-N,N-dicyclohexylamino-, -2-N,N- di(phenylmethyl)amino-, -2-N-phenyl-N-(phenylmethyl)amino-, -2-N-cyclohexyl-N-(phenylmethyl)amino- and -2-piperidino-1,3-thiazol-5-yl, 4-(4'-nitrophen-1'-yl)-2-N,N-dimethylamino-, and -2=N,N-diethylamino-1,3-thiazol-5-yl, 4-(4'-chlorophen-1'-yl)-2-N,N-diethylamino-, -2-N,N-dicyclopentylamino, -2-N-[2'-(4''-methylphen-1''-yl)eth-1'-yl]-N-methyl-amino and -2-N,N-di-n-hexyl-amino-1,3-thiazol-5-yl, 4-[4'-(but-1'''-oxy)-phen-1'-yl]-2-N,N-di-n-hexylamino-1,3-thiazol-5yl, 4-(2',4',-dimethylphen-1'-yl)-2-($\Delta^{2'}$-3',5',5'-trimethylpyrazolin-1'-yl)-1,3-thiazol-5-yl, 4-phenyl-2-(4'-methylpiperazin-1'-yl)-1,3-thiazol-5-yl, 4-(2',4',6'-trichlorophen-1'-yl)-2-(pyrrolidin-1'-yl)-1,3-thiazol-5-yl, 4(4'-bromophen-1'-yl)-2-N,N-diphenylamino-1,3-thiazol-5-yl, 4-(naphth-2'-yl)-2-N,N-diethylamino-1,3-thiazol-5-yl, 4-phenyl-2-N-methyl-N-(4'-ethoxyphen-1'-yl)amino-1,3-thiazol-5-yl, 2-N,N-diethylamino-1,3-thiazol-5-yl, N-ethylcarbazol-2-yl, N-propyl-isoindolin-5-yl, N-methylindol-3yl, N-methyl-2-phenyl-indol-3-yl, N-hexylindol-3-yl, N-methyl-5-chloro-indol-3-yl, N-methyl-1H-indazol-5-yl, pyridin-2-yl, pyrimidin-2-yl, pyridin-4-yl, pyridin-3-yl, pyrazin-2-yl, pteridin-2-yl, acridin-3-yl, 1,7-phenanthrolin-3-yl, pyridazin-3-yl, phenazin-1-yl, N-methylphenoxazin-2-yl, N-phenylphenothiazin-3-yl, N-ethylperimidin-4-yl, 1-ethyl-, 1-(2'-hydroxyethyl)-, 1,2,2,4-tetramethyl-, 2,2,4-trimethyl-1-ethyl-, 2,2,4-trimethyl-1-(2'-methoxyethyl) or 2,2,4-trimethyl-(2'-methanecarbonyloxy)-benzopiperidin-6-yl, 4-(2'-hydroxyethyl)- or 4-[2'-(prop-2''-en-1''-yl-oxy)-eth-1'-yl]-benzomorpholin-6-yl, 4H-quinolizin-2-yl, isoquinolin-3-yl, quinolin-2-, -3-, -6- or -8-yl, phthalazin-1-yl, 1,8-naphthyridin-2- or -5-yl, quinoxalin-2-yl, quinazolin-2-yl, cinnolin-3-yl, phenanthridin-6 or -3-yl, 8-N-butylamino-, 8-N-(2'-hydroxyethyl)amino or 8-N-(2'-methoxyethyl)amino-quinolin-6-yl, 2,6-dihydroxypyridin-3-yl, 4-methyl-pyridin-2-yl, 2-hydroxy-3-cyanopyridin-5-yl, 4-chloropyridin-2-yl, 2,6-dihydroxy-3-cyano-4-methyl-pyridin-5-yl, 4-(4'-chlorophen-1'-yl)pyridin-2yl, 4-methyl-3-cyano-2-N-phenylamino-6-N'-(2'-methoxyeth-1'-yl)amino-pyridin-5-yl, 4-methyl-3-cyano-2,6-bis-[N-(3'-methoxyprop-1'-yl)amino]-pyridin-1-yl or 4-methyl-3-cyano-2-N-butylamino-6-N'-(3'-methoxyprop-1'-yl)aminopyridin- 6-yl. Of these, 4-phenyl-2-N,N-dimethylamino-1,3-thiazol-5-yl, 4-phenyl-2,N,N-diethylamino-1,3-thiazol-5-yl, N-ethyl-carbazol-2-yl, N-methyl-2-phenylindol-3-yl and 2,6-dihydroxy-3-cyano-4-methyl-pyridin-5-yl are particularly advantageous.

Further suitable radicals $R^2$ in the naphtholactam dyes of the general structure I to be used according to the invention are radicals of the general formula V.

In the general structure V, q is 0 or 1. Independently thereof, r is 0, 1 or 2.

Examples of suitable radicals $R^9$ and $R^{11}$ in the general structure V are hydrogen atoms and, if q is 1, together an unsubstituted or $C_1$–$C_4$-alkyl substituted $C_2$–$C_3$-alkyl chain such as ethylene, propane-1,2-diyl, propane-1,3-diyl, butane-1,3-diyl, butane-2,3-diyl, 2,2-dimethylpropane-1,3-diyl or hexane-1,4-diyl or together one or two carbonyl groups.

The result is for the stipulation in the claim that
q=1 and $R^9$ and $R^{11}$ together be a substituted or unsubstituted $C_2$–$C_3$-alkyl chain,
a radical $R^2$ of the general structure V-a or V-b

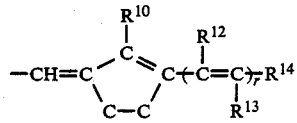

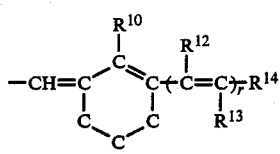

where the further indices and variables have the claimed meanings explained in more detail below.

Furthermore, the result is for the stipulation in the claim that
q=1 and $R^9$ and $R^{11}$ together be a carbonyl group a radical $R^2$ of the general structure V-c

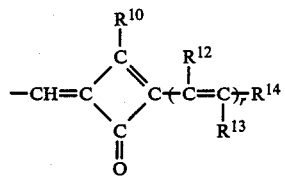

where the further indices and variables have the claimed meanings explained in more detail below.

Moreover, the result is for the stipulation in the claim that
q=1 and $R^9$ and $R^{11}$ each be a carbonyl group a radical $R^2$ of the general structure V-d

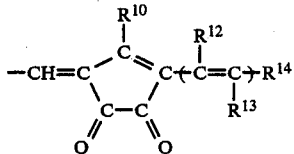

where the further indices and variables have the claimed meanings explained in more detail below.

Examples of suitable radicals $R^{10}$, $R^{12}$ and $R^{13}$ in the general structures V to V-d are hydrogen, halogen, oxygen, in particular with the single negative electric charge, cyano, nitro, hydroxyl, the above-described radicals $R^1$, methoxy, ethoxy, propyloxy, butyloxy, pentyloxy, hexyloxy, cyclopentyloxy, cyclohexyloxy, 4-methylcyclohexyloxy, phenyloxy, 2-methylphen-1-yl-oxy, 4-methylphen-1-yl-oxy, naphth-1-yl-oxy, benzyloxy (=phenylmethyloxy), 2-phenyl-eth-1-yl-oxy, 3-phenyl-prop-1-yl-oxy, 4-phenyl-but-1-yl-oxy, methoxycarbonyl, ethoxycarbonyl, prop-1-yl-oxycarbonyl, prop-2-yl-oxycarbonyl, but-1-yl-oxycarbonyl, but-2-yl-oxycarbonyl, pent-1-yl-oxycarbonyl, hex-1-yl-oxycarbonyl, cyclopentyloxycarbonyl, cyclohexyloxycarbonyl, benzyloxycarbonyl, 2-phenyl-eth-1-yl-oxycarbonyl, 3-phenyl-prop-1-yl-oxycarbonyl, 4-(naphth-2'-yl)-but-1-yl-oxy-carbonyl, phenyloxycarbonyl, naphth-1-yl-oxycarbonyl, naphth-2-yl-oxycarbonyl or the corresponding homologous aminocarbonyls, oxysulfonyls, sulfonyls or oxycarbonylaminyls or the above-described radicals $R^2$ which here are each a substituted or unsubstituted, monocyclic or fused heterocyle from the class of the azoles, azolines, azines and partially hydrogenated azines which is bonded to the olefinically unsaturated structure of the general formulae V to V-d via a carbon ring atom.

Examples of suitable radicals $R^{14}$ in the general structures V to V-d are the above-described radicals $R^2$ of the general formula III, the above-described radicals $R^2$ of the general formula IV, the above-described radicals $R^2$ which here are each a substituted or unsubstituted, monocyclic or fused heterocycle from the class of the azoles, azolines, azines and partially hydrogenated azines which is bonded to the olefinically unsaturated structures of the general structures V to V-d via a carbon ring atom, and further thiols such as thiophen-2-yl (=thien-2-yl), 4-methyl-thien-2-yl, 4-methyl-5-phenylthien-2-yl, 5-N,N-dimethylamino- and 5-N,N-diethylaminothien-2-yl, benzo[b]thien-2-yl, 4-methyl-benzo[b]thien-7-yl or naphtho[2,3-b]thien-2-yl or thianthren-2-yl, 2,3,7,8-tetramethyl-thianthren-1-yl or 3-chloro-thianthren-7-yl.

Examples of further suitable radicals $R^{14}$ in the general structures V to V-d are the radicals of the general formula VI.

In the general structure VI, $R^1$ has the abovementioned meanings for the radicals $R^1$ in the general formula I.

The index s in the general structure VI is 0, 1, 2 or 3. Independently thereof the index t in the general formula VI is likewise 0, 1, 2 or 3. The indices s and t have the same meaning in the general structure I as in the general structure VI.

Examples of suitable radicals $R^3$ and $R^4$ in the general structure VI are the above-described radicals $R^{10}$, $R^{12}$ or $R^{13}$ of the general formulae V to V-d, the above-described radicals $R^1$ of the general formula I, carboxylic, sulfonic or phosphonic acid groups, methanethio, ethanethio, propane-1-thio, propane-2-thio, butane-1-thio, butane-2-thio, tert-butylthio, pentane-1-thio, isopentane-1-thio, hexane-1-thio, hexane-2-thio, cyclopentanethio, cyclohexanethio, benzenethio, 4-methylbenzene-1-thio, 2-methylbenzene-1-thio, 3-chlorobenzene-1-thio, 4-chlorobenzene-1-thio, 2-ethylbenzene-1-thio, naphthalene-1-thio, naphthalene-2-thio, phenylmethanethio, 2-phenylethane-1-thio, 2-(4'-cyanophen-1'-yl)-ethane-1-thio, 3-phenylpropane-1-thio, 6-phenylhexane-1thio or the corresponding oxysulfonyls, sulfonyls or oxycarbonylaminyls or N,N-dimethyl-, N,N-diethyl-, N,N-di-n-propyl-, N,N-di-iso-propyl-, N,N-di-n-butyl-, N,n-butyl-N-tert-butyl-, N,N-di-pentyl-, N,N-di-hexyl-, N,N-diphenyl-, N-methyl-N-phenyl-, N-ethyl-N-phenyl, N,N-dibenzyl-, N,N-di-(2-phenyleth-1-yl)-, N-ethyl-N-benzyl-, N-phenyl-N-benzyl-, N-(4'-methylphenyl)-N-[2-(4'-cyanophen-1'-yl)-eth-1-yl]-, N,N-dicyclopentyl-, N,N-dicyclohexyl-, N-cyclopentyl-N-cyclohexyl-, N-methyl-N-cyclohexyl-, N-ethyl-N-cycloxyl-, N-phenyl-N-cyclohexyl-, N-benzyl-N- or N-(2-phenyl-eth-1-yl)-N-cyclohexylamino, -aminosulfonyl or -aminocarbonyl. Here the radicals $R^3$ and $R^4$ are different from or identical to each other.

Further examples of suitable radicals $R^3$ and $R^4$ also include carbon, nitrogen, oxygen and/or sulfur atoms which form part of the skeleton of one or more rings fused to the naphth-1,8-ylene group of the general structure VI, in which case here in particular the substitution patterns VI-1 to VI-15 come into consideration:

VI-1, t = 2,

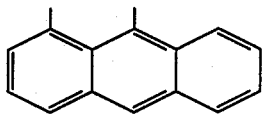

VI-2, t = 2,

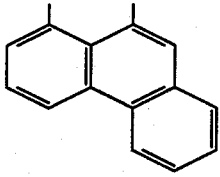

VI-3, s and t = 2,

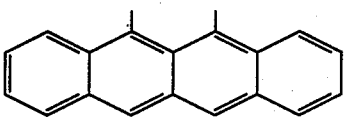

VI-4, s = 1, t = 2,

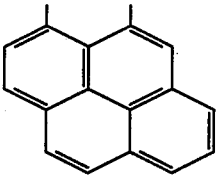

VI-5, s and t = 1,

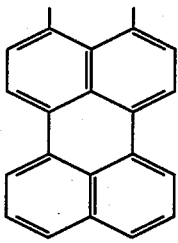

VI-6, s and t = 1,

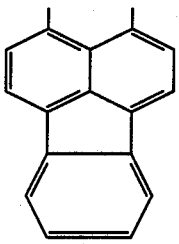

VI-7, t = 2,

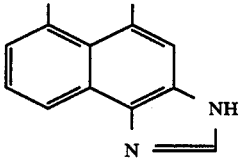

VI-8, t = 2,

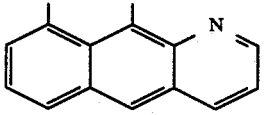

VI-9, t = 2,

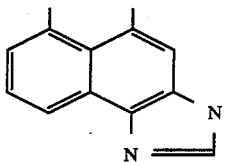

VI-10, t = 2,

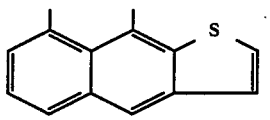

VI-11, s and t = 1,

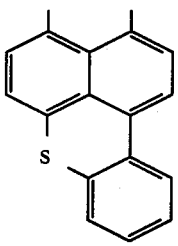

VI-12, t = 2,

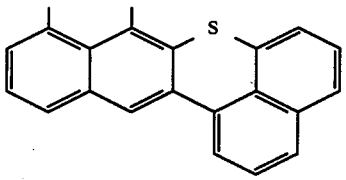

VI-13, s = 1, t = 2,

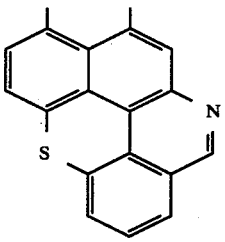

VI-14, s = 3, t = 2,

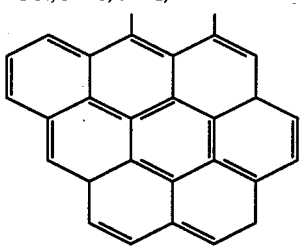

or VI-15, t = 2,

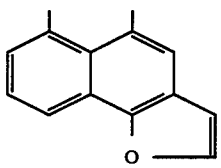

of which the substitution pattern VI-11 is particularly preferred.

In the general structure I, the variables $R^3$ and $R^4$ and also the indices s and t have the same meanings as in the formula VI.

Moreover, suitable radicals $R^2$ in the naphtholactam dyes of the general structure I to be used according to the invention are radicals of the general structure VII where the variables $R^1$, $R^3$ and $R^4$ and the indices s and t have the same meanings as specified for the structure VI and where $R^{15}$ is the radical of an acidic CH compound.

Acidic CH compounds are compounds which have loosely bonded methylene or methine protons in the α-position relative to one or two aldehyde, keto, ester, nitrile or nitro groups. Such compounds are known to be capable of the generally known aldol condensation, aldol addition, Perkin reaction, Knoevenagel condensation or Mannich reaction.

Examples of suitable radicals $R^{15}$ are barbituric acid radicals (=1,3-diazine-2,3,6-trion-5-yl) of the general structure VIII

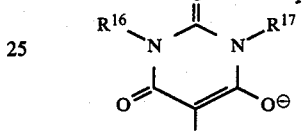

VIII where $R^{16}$ and $R^{17}$ are identical to or different from each other and are each $C_1$–$C_{22}$-alkyl, $C_5$–$C_7$-cycloalkyl, $C_6$–$C_{10}$-aryl, ω-aryl-$C_1$–$C_6$-alkyl, oxaalkanyl, azaalkanyl or thiaalkanyl.

Examples of suitable radicals $R^{16}$ and $R^{17}$ are the above-described alkyl, cycloalkyl, aryl or ω-arylalkyl radicals $R^1$ of the general structure I, the alkoxy substituted alkyl radicals R1 of the general structure I, the alkyl radicals $R^1$ of the general structure I which are substituted with alkylthio radicals $R^1$, and the alkylamino-substituted alkyl radicals $R^1$ of the general structure I of which methyl, ethyl, butyl and 6-ethyl-4-oxadec-1-yl are particularly preferred.

If in the naphtholactam dyes of the general structure I radicals $R^2$ of the general structures V to V-d where $R^{14}$ is a radical of the general structure VI or radicals $R^2$ of the general structure VII are used, it is of very particular advantage when the variables $R^1$, $R^3$ and $R^4$ and also the indices s and t of the general structures VI and VII are identical to the corresponding variables and indices of the general structure I.

Examples of suitable anions X in naphtholactam dyes of the general structure I are chloride, bromide, iodide, nitrate, sulfate, perchlorate, bromate, tetrafluoroborate, hexafluorophosphate, hexafluorosilicate, methanesulfonate, benzenesulfonate, ethylsulfate, phosphate, salicylate, oxalate, acetate, trifluoromethanesulfonate, tetrachlorozincate, tetrachloroaluminate, hexachloroferrate, hexafluoroarsenate, hexafluoroantimonate, hexachloroantimonate or the nickeldithiolate anions described in EP-A-0,224,261.

Here the naphtholactam dyes of the general structure I to be used according to the invention or, in short, the naphtholactam dyes I do not contain an anion if the single positive electric charge on the naphtholactam nitrogen in the structure I is neutralized by a single negative electric charge in the naphtholactam dye I, this arrangement being generally referred to as a betain structure and corresponding to the stipulation n=0 in the claim.

If the naphthalolactam dye I additionally contains further single negative charges, for example a plurality of sulfo groups, they are naturally bonded to customary and known cations. This too conforms to the stipulation n=0 in the claim.

As for the rest, n, depending on the number of positive electric charges in the naphthalolactam dye I on the one hand and the number of negative electric charges in the anion X on the other hand, is ⅓, ½, ⅔, 1, 2 or 3.

Examples of naphtholactam dyes I which are used with very particular advantage according to the invention are the naphtholactam dyes I-1 to I-120:

I-1
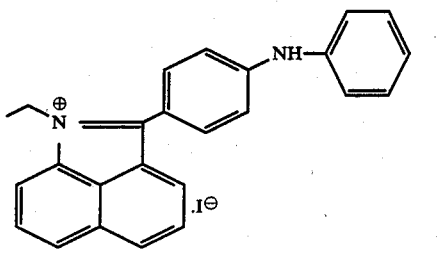

I-2
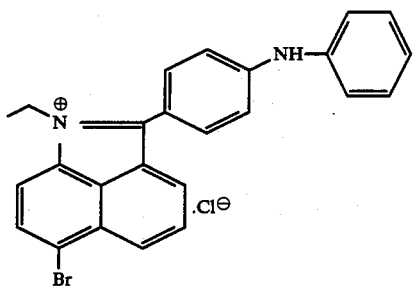

I-3
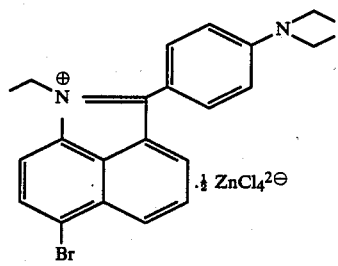

I-4
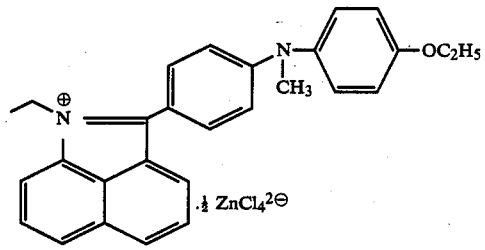

I-5
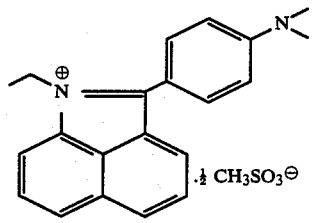

-continued
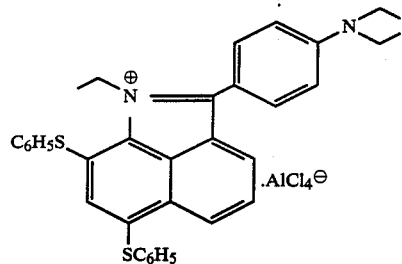
I-6
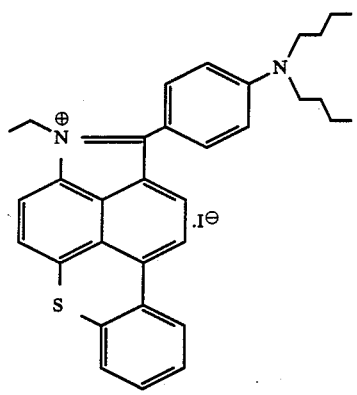
I-7
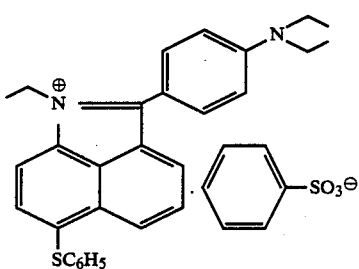
I-8
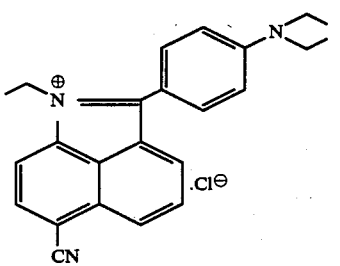
I-9
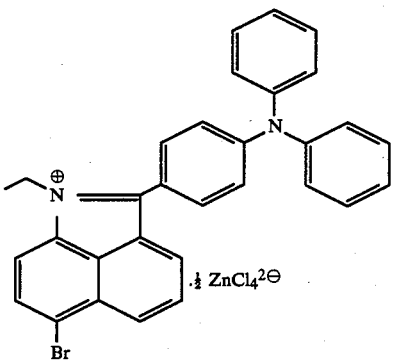
I-10

I-11
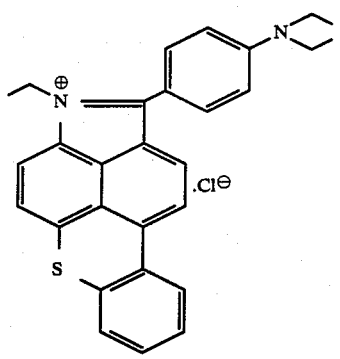
I-12
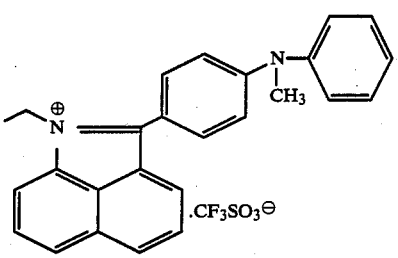
I-13
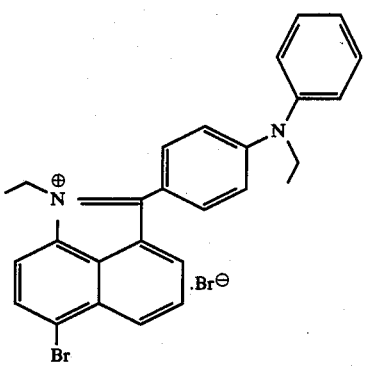
I-14
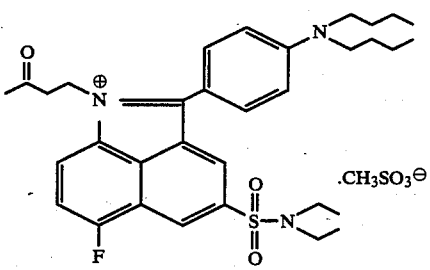
I-15
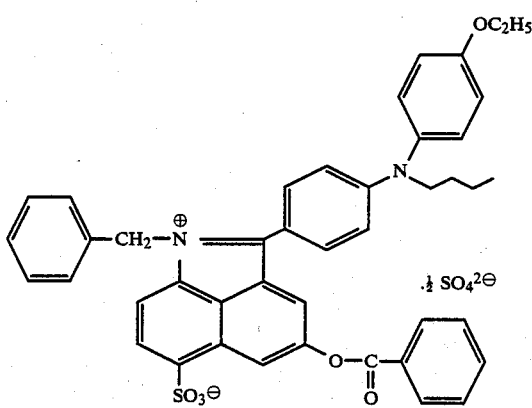

-continued
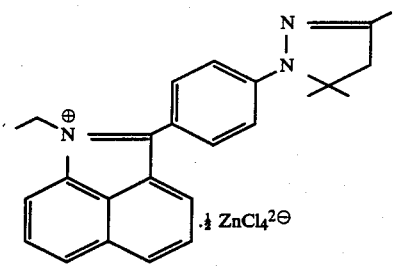
I-16
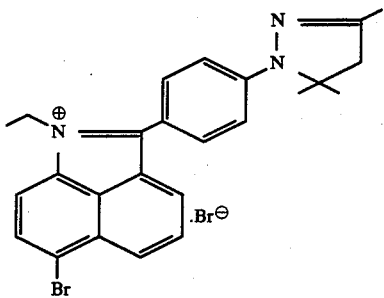
I-17
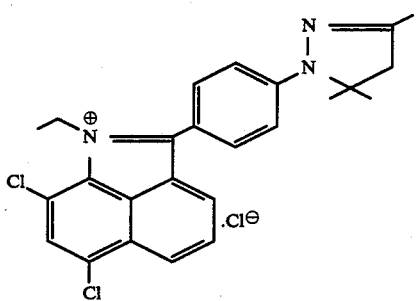
I-18
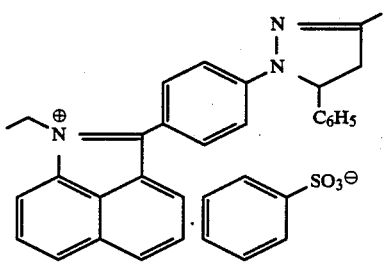
I-19
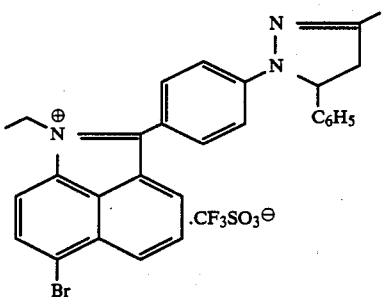
I-20

I-21
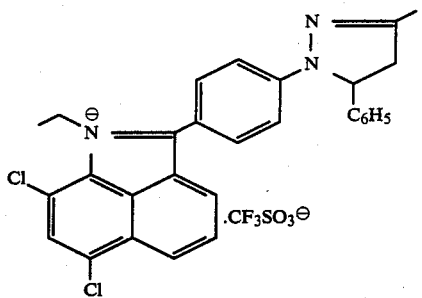
I-22
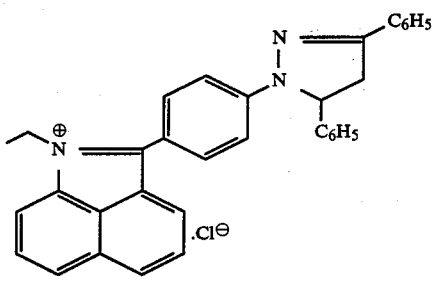
I-23
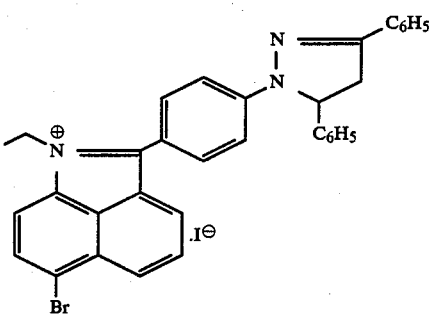
I-24
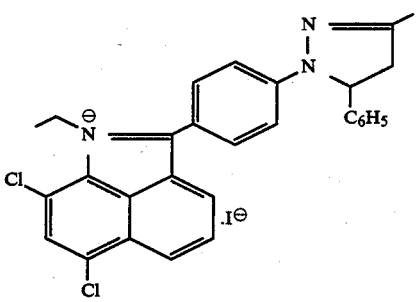
I-25
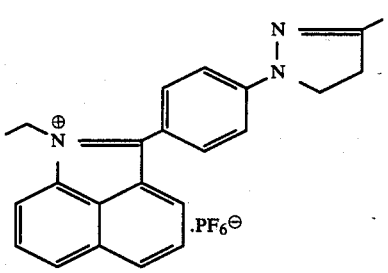

-continued
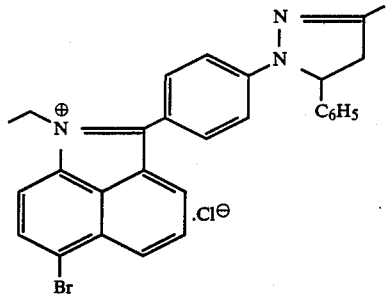
I-26
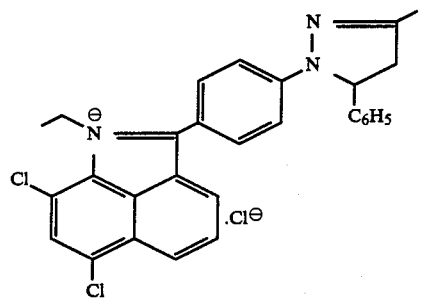
I-27
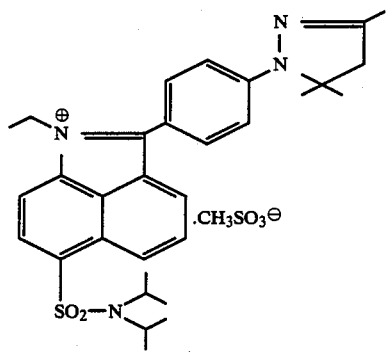
I-28
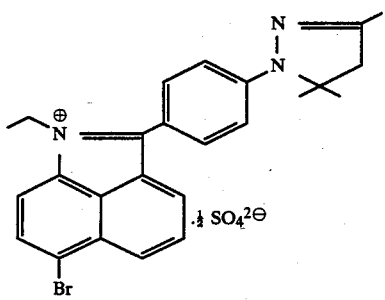
I-29
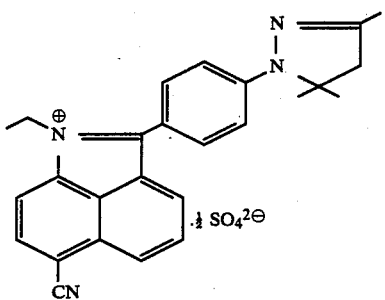
I-30

-continued

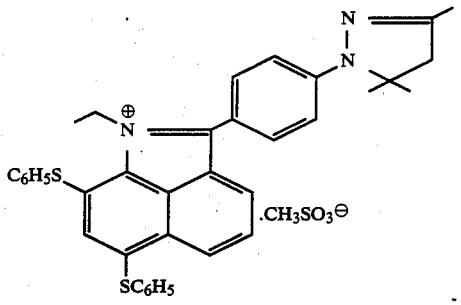

I-31

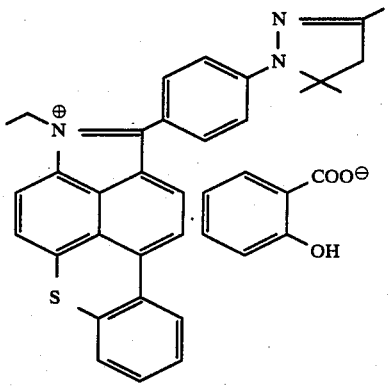

I-32

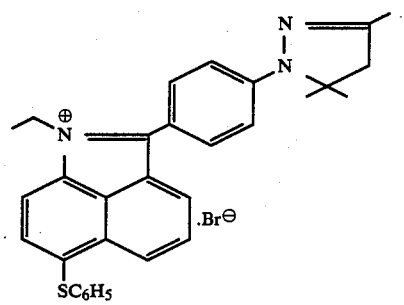

I-33

Examples of naphtholactam dyes I which are used with particular advantage according to the invention and which then give an outstanding technical effect are the naphtholactam dyes I-2, I-3, I-10, I-13, I-16, I-34, I-35, I-48, I-57, I-60, I-71, I-77, I-85, I-96, I-97, I-98, I-99, I-102, I-103, I-107 and I-115.

The naphtholactam dyes I to be used according to the invention are present in the novel photoconductive layer (B) as sensitizers ($b_2$) as well as components ($b_1$), ($b_3$) and any ($b_4$) in an amount of from 0.05 to 20, preferably of from 0.1 to 18, advantageously of from 0.5 to 15, in particular of from 1.0 to 10, parts by weight per 100 parts by weight of binder ($b_1$).

If less than 0.05 part by weight of these sensitizers ($b_2$) is added to photoconductive layer (B) per 100 parts by weight of ($b_1$), their light sensitivity leaves something to be desired. If, by contrast, more than 20 parts by weight of ($b_2$) are used per 100 parts by weight of ($b_1$), then in certain circumstances the dark conductivity may increase to undesirably high levels and the mechanical strength of the novel photoconductive layer (B) may decrease markedly, which, despite the otherwise excellent properties of the layer (B), will in general not be acceptable. The range from 0.05 to 20 parts by weight ($b_2$) per 100 parts by weight of ($b_1$) thus represents an optimum range within the limits of which the amount of ($b_2$) is freely choosable and further adaptable to the particular technical problem, the particular intended use and/or the particular material composition of the recording element according to the invention. In this context, the selected amount of naphtholactam dyes I.(sensitizer $b_2$) depends in particular on the amount of charge carrier transporter compounds or photoconductors ($b_3$) and on whether further customary are present as additives ($b_4$) in the photoconductive layer (B).

The naphtholactam dyes I to be used according to the invention are also used as a separate sensitizer layer. In this arrangement, the layer comprising one or more naphtholactam dyes I and optionally one or more binders ($b_1$) is present directly on the electrically conducting base (A) and is covered with a layer which contains binders ($b_1$), photoconductors ($b_2$) and any additives ($b_4$). The thickness of the sensitizer or naphtholactam dye I layer is from 0.005 to 5, preferably from 0.05 to 3, advantageously from 0.08 to 2, in particular from 0.1 to 0.9, $\mu$m. If this sensitizer layer is thinner than 0.005 $\mu$m, it may in certain circumstances no longer provide complete and uniform coverage of the surface of base (A) and its sensitizer action, i.e. its charge carrier generator action, may no longer be sufficient for a given technical problem. If the sensitizer layer is thicker than 5 μm, it may impair the drain-off of electric charges on imagewise exposure with actinic light. As regards sensitization, i.e. the generation of a sufficient number of charge carriers, the uniformity of thickness, the adhesion to base (A) and the avoidance of a certain barrier effect, the thickness range from 0.005 to 5 μm thus represents an optimum. Within this range the thickness of the sensitizer layer is freely choosable and further adaptable to the particular technical problem, the particular intended use and/or the particular material composition of the recording elements according to the invention.

Examples of naphtholactam dyes I to be used according to the invention which have the structure illustrated by reference to naphtholactam dyes I-1 to I-15 the preparation thereof are known from DE-A-2,010,579, DE-A-1,165,790, DE-A-1,569,660 and DE-A-2,328,163.

Examples of naphtholactam dyes I to be used according to the invention which have the structure illustrated by reference to naphtholactam dyes I-16 to I-14 and the preparation thereof are known from JP-B-72-24,244 and DE-A-2,328,163.

Examples of naphtholactam dyes I to be used according to the invention which have the structure illustrated by reference to naphtholactam dyes I-41 to I-44 and the preparation thereof are likewise known from the prior art.

By contrast, naphtholactam dyes I to be used according to the invention which have the structure illustrated by reference to naphtholactam dyes I-45 to I-60 are novel. They are therefore referred to for short as naphtholactam dyes I according to the invention. They are prepared by condensing a naphtholactam of the general formula IX

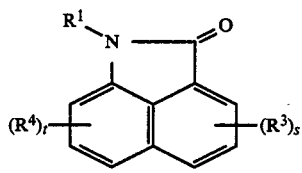

where the indices and variables are as defined above, with suitable 1,3-thiazole derivatives in the presence of $POCl_3$ and $ZnCl_2$. Suitable 1,3-thiazole derivatives here are all those from which the aforementioned 1,3-thiazolyl radicals are derived, but in particular 4-aryl-2-N,N-dialkylamino-, -2-N,N-dicycloalkylamino-, -2-N-alkyl-N-cycloalkylamino-, -2-N,N-diarylamino-, -2-N-alkyl-N-arylamino-, -2-N-cycloalkyl-N-arylamino-, -2-N,N-di(ω-arylalkyl)amino-, -2-N-alkyl-N-(ω-arylalkyl)amino-, -2-N-(ω-arylalkyl)-N-arylamino-, -2-N-(ω-arylalkyl)-N-cyclo-alkylamino-, -2-(azolidin-1-yl)-, -2-(azol-1′-yl)- and the 4-aryl-2-(perhydroazin-1′-yl)-1,3-thiazole, of which 4-phenyl-2-N,N-diethylamino-1,3-thiazole is very particularly preferred.

The condensation is carried out in solution. To this end, anhydrous, inert organic solvents are used, for example 1,2-dichloroethane. Advantageously, first a liquid mixture of $POCl_3$, anhydrous zinc chloride and a naphtholactam IX is prepared and the solution of a suitable 1,3-thiazole in 1,2-dichloroethane is metered into this mixture at from 50° to 100° C., in particular at from 60° to 90° C. Thereafter the resulting reaction mixture is refluxed with stirring for a certain time, advantageously for from 1 to 10 hours. Thereafter the hot or cold reaction mixture is poured into hot or cold water, the 1,2-dichloroethane is distilled off, and the resulting aqueous phase is admixed with the highly concentrated solution of a salt, thereby precipitating the naphtholactam dye I according to the invention as a crystalline solid. Thereafter the naphtholactam dye I according to the invention is separated off, purified if necessary and then dried, using the separating, purifying and drying methods known and customary in preparative organic chemistry. However, the condensation may also be carried out without a solvent.

The naphtholactam dyes I according to the invention are used with particular advantage as sensitizers ($b_2$) in the electrophotographic recording elements according to the invention. Moreover, they are suitable for producing recording layers on laser-optical data disks.

Examples of naphtholactam dyes I to be used according to the invention which have the structure illustrated by reference to the naphtholactam dye I-62 and the preparation thereof are known from CA-A-1,023,188, which also describes the use thereof in silver halide emulsions. These emulsions are used for producing direct positive photographic films.

Examples of naphtholactam dyes I to be used according to the invention which have the structure illustrated by reference to naphtholactam dyes I-63 to I-68 and the preparation thereof are known from EP-A-0,224,261, which also describes the use thereof in producing recording layers on laser-optical data disks.

Examples of naphtholactam dyes I to be used according to the invention which have the structure illustrated by reference to naphtholactam dyes I-69 to I-97, the preparation thereof and the use thereof for producing recording layers on laser-optical data disks are described in German Patent Application P 3608214.7.

Examples of naphtholactam dyes I to be used according to the invention which have the structure illustrated by reference to naphtholactam dyes I-98 to I-117, the preparation thereof and the use thereof for producing recording layers on laser-optical data disks are described in German Patent Application P 3631843.4.

Examples of naphtholactam dyes I to be used according to the invention which have the structure illustrated by reference to naphtholactam dyes I-118 to I-120, the preparation thereof and the use thereof for producing recording layers on laser-optical data disks are described in German Patent Application P 3738911.4.

The second essential constituent of the novel photoconductive layers (B) of the electrophotographic recording elements according to the invention is binder ($b_1$).

The nature of binders ($b_1$) suitable for layers (B) depends on the intended use of the recording elements. Suitable for the copying sector are for example cellulose ethers, polyester resins, polyvinyl chlorides, polycarbonates, copolymers, such as styrene/maleic anhydride copolymers or vinyl chloride/maleic anhydride copolymers, or mixtures of such binders ($b_1$). The chief selection criteria are the film-forming and electrical properties, the adhesion to the base material and the solubility characteristics. In particular in the case of recording elements for producing printing plates, in particular those for offset printing, particularly suitable binders ($b_1$) are those which are soluble in alkaline, aqueous or alcoholic solvents. They comprise in particular binders ($b_1$) having alkali-solubilizing groups such as anhydride, carboxyl, sulfo, phenol or sulfonimide groups. Preference is given to binders ($b_1$), in particular those having high acid numbers, which are readily soluble in basic aqueous alcoholic developer solvents and have a weight average molecular weight of from 800 to 150,000, in particular 1,200 to 80,000. Suitability is possessed for example by copolymers of methacrylic acid and methacrylic esters, in particular copolymers of styrene and maleic anhydride and of styrene, methacrylic acid and methacrylic esters, as long as they meet the aforementioned solubility condition. Although, as is known, binders ($b_1$) having free carboxyl groups undesirably increase the dark conductivity of electrophotographic layers and thereby can lead to poor tonering results, such binders are easily adaptable to the charge transport compounds or photoconductors ($b_3$) used. It has been found, for instance, that copolymers of styrene, maleic anhydride and acrylic or methacrylic acid which contain from 5 to 50 % by weight of copolymerized maleic anhydride and from 5 to 35, in particular from 10 to 30, % by weight of copolymerized acrylic or methacrylic acid units give photoconductive layers (B) of low dark conductivity. They show excellent solubility in developer solvents comprising 75 % by weight of water, 23 % by weight of isobutanol and 2 % by weight of sodium carbonate.

The third essential constituent of the novel photoconductive layers (B) of the electrophotographic recording elements according to the invention is the charge carrier transporter compound or photoconductor ($b_3$). It comprises the conventional low molecular weight oxazole derivatives (DE-B-1,120,875), oxadiazole derivatives (DE-B-1,058,836), triazole derivatives (DE-B-1,060,260), azomethines (US-A-3,041,165), pyrazoline derivatives (DE-B-1,060,714), imidazole derivatives (DE-B-1,106,599), arylamines (DE-B-2,712,557), 1,3-dithiol derivatives (DE-B-3,338,204), benzotriazole derivatives (EP-A-0,131,292), triazolylpyridine derivatives (EP-A-0,150,419), pyrazolotriazole derivatives (EP-A-0,156,308), triphenyltriazole derivatives (EP-A-0,162,216) or hydrazone derivatives (EP-A-0,001,599, DE-A-2,919,791 US-A-4,367,273 and US-A-4,278,747, GB-A-2,088,074 or DE-A- 3,140,571) or the likewise conventional oligomeric or polymeric photoconductors poly(N-vinylcarbazole) or arylamine polymers (EP-A-0,052,961).

The novel photoconductive layers (B) contain one or more of these photoconductors ($b_3$) in an amount of from 40 to 150, preferably from 40 to 130, advantageously from 50 to 120, in particular from 60 to 100, parts by weight per 100 parts by weight of binder ($b_1$).

The novel photoconductive layer (B) may in addition contain, based on its total amount, up to 30% by weight, preferably 25% by weight, advantageously 20% by weight, in particular 15% by weight, of additives.

Suitable additives are essentially only those which do not impair the optical transparency of the novel photoconductive layer (B), although the additives may have a wide range of functions. For instance, flow control agents such as silicone oils, wetting agents, in particular nonionic substances, plasticizers based on chlorinated hydrocarbons or on phthalic esters, adhesion promoters, non-molecularly dispersible organic and inorganic fillers and reinforcing fillers, the metal acetylacetonates known from EP-A-0,131,215 and/or the conventional sensitizers of the classes of the triarylmethane, xanthene or cyanine dyes may be additionally added to the layer (B). Moreover, the novel photoconductive layer (B), if constructed as a photoconductive double layer, may contain in the separate sensitizer layer charge carrier generator pigments from the classes of the azo, phthalocyanine, isoindoline and/or perylene dyes. These pigments, however, may also be present as a further additional separate sensitizer layer. Furthermore, these pigments may be present as a single separate sensitizer layer of the novel double layer (B), although the separate layer composed of ($b_1$), ($b_3$) and any ($b_4$) must obligatorily contain the naphtholactam dyes I to be employed according to the invention.

Accordingly, the novel photoconductive layers (B), based on their total amount, consist of from 70 to 100, preferably from 75 to 100, advantageously from 80 to 100, in particular from 85 to 100, % by weight of a sensitized photoconductive mixture of components ($b_1$), ($b_2$) and ($b_3$)
and of
from 0 to 30, preferably from 0 to 25, advantageously from 0 to 20, in particular from 0 to 15, % by weight of additives ($b_4$).

Here the sensitized photoconductive mixture consists of
100 parts by weight of a binder ($b_1$) or a plurality of binders ($b_1$),
from 0.05 to 20, preferably from 0.1 to 18, advantageously from 0.5 to 15, in particular from 1.0 to 10, parts by weight of a naphtholactam dye I to be used according to the invention or of a plurality of naphtholactam dyes I to be used according to the invention (=sensidyestizer $b_2$) and from 40 to 150, preferably from 40 to 130, advantageously from 50 to 120, in particular from 60 to 100, parts by weight of a photoconductor ($b_3$) or a plurality of photoconductors ($b_3$).

If the novel photoconductive layer (B) is not constructed as a double layer, its thickness is from 0.5 to 40, preferably from 0.8 to 25, advantageously from 1 to 20, in particular from 1.5 to 15, $\mu m$.

If the novel photoconductive layer (B) has been constructed as a double layer, the thickness of the sensitizer layer containing the naphtholactam dyes I is, as stated above, from 0.005 to 5, preferably from 0.05 to 3, advantageously from 0.08 to 2, in particular from 0.1 to 0.9, $\mu m$, and the total thickness of the double layer is from 2 to 30, preferably from 3 to 25, advantageously from 3.5 to 20, in particular from 5 to 15, $\mu m$.

Aside from the novel photoconductive layer (B), the electrically conducting base (A) is the further essential constituent of the electrophotographic recording elements according to the invention. It is basically possible to use for this purpose any electrically conducting base material as long as it can be processed into dimensionally stable thin plates or sheets. Depending on the intended use of the recording material according to the invention, aluminum, zinc, magnesium, copper, steel or multimetal plates polymer films having a metallized surface, such as aluminum vapor deposition coated polyethylene terephthalate films or electrically conducting special papers are used. Here preference is given in particular to the raw or pretreated aluminum sheets or foils which are typical for offset printing plates. The pretreatment of the aluminum sheets or foils comprises a chemical, mechanical or electrochemical roughening of the surface and/or an anodic oxidation to form a porous aluminum oxide layer, with or without a subsequent sealing of the oxide layer in question. In general, bases (A) vary in thickness, with the intended use of the recording materials, from 50 $\mu m$ to 1.5 mm, in particular from 80 $\mu m$ to 0.6 mm. In addition, the electrophotographic recording elements according to the invention may contain at least one further layer which is useful to the functioning of the recording elements. This further layer or layers can be one of the above-described known additional sensitizer layers which are arranged between the base (A) and the novel photoconductive layer(B). Furthermore, it is possible to use the layers of for example particulate titanium dioxide, zinc oxide, α-iron(III) oxide, barium titanate, aluminum oxide or cerium oxide known from DE-B-2,504,545. It is also possible to use layers of inorganic photoconductors such as selenium or cadmium sulfide as additional constituents of the electrophotographic recording elements. Furthermore, it is also possible to use the top layers of silicon monoxide, magnesium fluoride or calcium fluoride known from EP-A-0,046,960.

The preparation of the electrophotographic recording elements according to the invention has no special methodical features; on the contrary, the preparation of the novel photoconductive layer (B) is effected by conventional methods of preparing thin organic layers, and the preparation of the electrically conducting base (A) is effected by the conventional methods of preparing thin metal sheets or foils and metal vapor deposition coated polymer films.

In an advantageous procedure of preparing photoconductive layers (B), the components of the novel photoconductive layers (B) are dissolved in suitable solvents, and the resulting solutions are cast onto the bases (A) in such a way that, following drying of the wet layers, the layers (B) are obtained in the desired uniform thickness. If the novel photoconductive layers (B) are to be constructed as double layers, then the naphtholactam dye I-containing sensitizer layers are first produced in the desired thickness by casting from solution and drying the wet layers on the surface of base (A). Thereafter these sensitizer layers are covered with layers of components ($b_1$), ($b_3$) and any ($b_4$) by casting from solution and drying the wet layers, care being taken to ensure that the solvents used here do not damage the sensitizer layers present. The preparation of the casting solutions in question is effected by means of conventional mixing and dissolving techniques.

If the electrophotographic recording elements according to the invention are to contain further layers in addition to the novel photoconductive layer (B), these further layers are produced by means of methods which are conventional and characteristic for preparing the particular layers. It is of course the case that the order in which the individual process steps are carried out depends on, or rather is predetermined by, the desired structure for the electrophotographic recording elements.

The electrophotographic recording element according to the invention has numerous outstanding properties which hitherto were not simultaneously realizable in kind and number by means of existing recording elements. This hitherto unobtainable combination of outstanding properties has a particular unexpected technical effect which manifests itself advantageously not only with the recording materials according to the invention themselves but specifically also with the consecutive products produced therefrom, namely the drums in photocopiers, offset printing plates and photoresists, and last but not least with the photocopies, printed copies and circuit boards produced therewith.

For instance, the recording element according to the invention combines a very low dark conductivity with a high electrostatic chargeability, a particularly high sensitivity to actinic light and excellent electrokinetic properties. This range of properties brings about excellent, extremely detailed, high-contrast reproduction of image originals in a shorter time than hitherto possible, which is a particularly significant advantage in particular for the practical operations of a reprographics business.

Moreover, the recording element according to the invention which has been subjected to imagewise exposure is completely free of any scumming tendency in the nonimage areas, thereby appreciably improving, if not making possible in the first place, the high-contrast reproduction of critical fine image elements in image originals, such as the reproduction of fine halftone dots in light tonal areas. Despite its high sensitivity to actinic light, the recording element according to the invention is simple to handle, so that its handling does not require any special precautions. Owing to this high sensitivity to actinic light and the particularly rapid photodrop induced thereby and also because the law $$I \cdot t = \text{constant}$$

(I=light intensity; t=time)

is also valid in the nanosecond range, the recording element according to the invention makes it possible to utilize the advantages of modern exposure methods in full. It is therefore suitable not only for the customary imagewise exposure by means of incandescent lamps and fluorescent tubes which emit light in the ultraviolet and/or visible wavelength regions but also for the imagewise exposure by means of pulse code modulated or analog modulated laser beams guided across the recording element. It is thus possible to effect imagewise exposure with modern computer-controlled laser light exposure instruments to obtain on account of the advantageous properties of the recording element quite outstanding imaging results. It is possible here to use not only those expose units operating with laser light in the visible wavelength region but also those using laser light in the infrared wavelength region. Owing to the particular properties of the recording element this results directly in a further advantage, namely that it is possible to utilize for the exposure with red or infrared laser light the known small, inexpensive and easy to manufacture semiconductor lasers based for example on GaAlAs or GaAlInP, thereby making the exposure procedure as a whole appreciably more efficient, more flexible and more economical.

The recording element according to the invention has distinct advantages for use in the photocopying sector. For instance, it is easy to apply to the drums customarily present in photocopiers and in this form makes it possible to produce excellent photocopies even of yellowed originals in long runs and a very short cycle time. In addition, these drums are simple to dispose in an environmentally safe manner after their advantageously long life. The photocopies produced therewith are particularly high in contrast, true to detail even in problematic image elements and untonered in the nonimage areas.

The recording element according to the invention also has distinct advantages for use as a photoresist. For this purpose it is applied to bases (A) customarily used for producing circuit boards. Thereafter it is subjected to imagewise exposure with actinic light, again fully benefiting from the aforementioned advantages of modern exposure methods. Thereafter a toner image is produced in a conventional manner on the exposed recording material and fixed by heating, and the untonered nonimage areas are then removed with suitable developer solvents. This gives an excellent photoresist image which is faithful down to the last detail, which is free of pitting, underpenetration of relief sidewalls and edge fragmentation, which adheres firmly to the base (A) and which is very highly resistant to the etching reagents and electro-plating baths customarily used. This process produces, substantially without rejects, error-free circuit boards which have an advantageously long life.

The recording element according to the invention has particularly distinct advantages for use in the production of offset printing plates produced in a conventional manner by 1. electrostatic charging of the recording element according to the invention by means of a high-voltage corona,
2. immediately thereafter subjecting the recording element to imagewise exposure with actinic light to produce a latent electrostatic charge image,
3. developing the latent electrostatic charge image by means of a dry or liquid toner,
4. fixing the toner image by heating and
5. removing the untonered nonimage areas of the novel photoconductive layer (B) by means of a suitable developer liquid to bare the hydrophilic surface of the base (A).

In this use, the recording element according to the invention can be subjected to a particularly high voltage and to imagewise exposure within a short exposure time thereby fully utilizing the advantages of modern exposure methods, in particular exposure with red or infrared laser light. The rapid and reliable results are high-contrast latent charge images which are completely faithful down to the last detail and which give toner images which are completely untonered in the nonimage areas. This reprographic accuracy also makes it possible to use toners which would otherwise not be considered suitable, so that the entire production process can be made more varied and better adapted to specific technical problems. After the toner image has been fixed, the nonimage areas are removable without problems and without subsequently damaging the toner image. A large number of different developer solvents can be used for this purpose. The choice of developer solvent depends first and foremost on the material composition of the originally photoconductive layer (B), the crucial parameter being the solubility or swellability of the binder ($b_1$) present therein. Owing to the now possible improved mutual adaptation of the toner materials and the materials of the original layer (B), it is possible to use developer solvents which are appreciably more powerful and/or washout methods employing higher solvent or brush pressure. The result is a shorter development time, but no image area damage is incurred.

The offset printing plate obtained in this manner gives excellent reproduction even of those image elements which are otherwise only very difficult to reproduce reliably. It can be further prepared in a known manner for offset printing, for example by means of hydrophiling and gumming, to further increase its already excellent quality.

On printing on an offset press with offset printing inks of the oil in water type, the printing areas of the offset printing plate are highly receptive toward the oily inks, while the cleared areas of the plate are highly water-receptive. The result is an excellent contrast and extremely precise printing, which as a whole leads to excellent printed copies. Since the offset printing plate has an advantageously long life under printing conditions, moreover, a long run is obtained.

EXAMPLES AND COMPARISONS

In the Examples and Comparisons below, the application properties were determined using the xerographic process (Carlson process). To this end, not only novel (Examples 1 to 29) but also prior art (Comparisons C1 to C10) electrophotographic recording elements were prepared, charged uniformly in a conventional manner by means of a direct voltage corona of $+8.5$ kV or $-8.5$ kV at a distance of 1 cm to a surface potential of up to $+1,000$ or $-1,000$ V in the course of 20 seconds and thereafter subjected to uniform or imagewise exposure. The individual process steps here were of course each carried out under exactly comparable conditions, so that the voltage drop measured on induction by the one second uniform exposure (=photodrop PD in %, original value=100 %) clearly indicated the advantageousness of the recording elements according to the invention.

EXAMPLES 1 AND 2 AND COMPARISON C1

General experimental method:

In each case, 0.544 g of a copolymer containing 52% by weight of styrene, 28% by weight of methacrylic acid and 20% by weight of maleic anhydride in copolymerized form (binder $b_1$) was dissolved in 9 g of tetrahydrofuran in the course of 30 minutes. 0.5 g of 2,5-bis(4'-diethylaminophen-1'-yl)-1,3,4-oxadiazole (photoconductor $b_3$) was added to each of the resulting copolymer solutions and stirred in for a further 15 minutes.

In parallel therewith, sensitizer solutions were prepared from 0.006 g each of a naphtholactam dye I to be used according to the invention (sensitizer $b_2$, Examples 1 and 2) or 0.006 g of Rhodamine B (Comparison C1) and 1 g each of ethylene glycol monoethyl ether.

Thereafter, each sensitizer' solution was combined with a binder/photoconductor solution. The combined solutions were cast onto 0.30 mm thick electrochemically roughened and anodically oxidized aluminum sheets (bases A) and dried, so that the 5 pm thick novel photoconductive layers (B) (Examples 1 and 2) and prior art photoconductive layers (Comparison C1) were obtained.

These layers were negatively charged and then exposed with a xenon high pressure lamp where the shortwave visible spectrum had been filtered off by means of a conventional high pass filter from Spindler und Hoyer, so that only the spectrum above $\lambda=590$ nm was used. The resulting photodrop was measured inductively in a conventional manner.

Table 1 provides information about the sensitizers ($b_2$) used here and summarizes the measurements obtained.

TABLE I

The sensitizing effect of naphtolactam dyes I to be used according to the invention compared with the action of Rhodamine B

|        | Sensitizer | Photodrop (PD) (%) |
|--------|------------|--------------------|
| Ex. 1  | I-16       | 94                 |
| Ex. 2  | I-34       | 94                 |

TABLE I-continued

The sensitizing effect of naphtholactam dyes I to be used according to the invention compared with the action of Rhodamine B

| Sensitizer | | Photodrop (PD) (%) |
|---|---|---|
| Comp. C1 | Rhodamine B | 84 |

EXAMPLE 3

The general experimental method of Examples 1 and 2 was repeated, except that the 0.006 g of sensitizer ($b_2$) was replaced by a mixture of 0.01 g of naphtholactam dye I-16 and
0.006 g of Rhodamine B.

The resulting recording element according to the invention showed a photodrop of 96%.

EXAMPLE 4 AND COMPARISON C1

Example 1 and Comparison C1 were repeated, except that both the recording element according to the invention and the prior art recording element were, after charging, subjected to imagewise exposure in the laser recorder from Hope by means of a helium-neon laser (wavelength $\lambda$ of main emission=633 nm). Here the writing speed was 193 m.s$^{-1}$ for an image dot frequency of 3.8 MHz, corresponding to 42 cm$^2$.s$^{-1}$ of exposed surface area for a plate advance in 27 $\mu$m steps.

After the imagewise exposure the recording element according to the invention and the prior art recording element were tonered using as the toner a carbon black dispersed in a thermoplastic. After tonering, the two resulting toner images were fixed by heating to 100° C.

The prior art recording element already showed disadvantages at this stage, in that its nonimage areas had been slightly but nevertheless noticeably tonered, while the recording element according to the invention was completely toner-free in the nonimage areas.

Thereafter the two recording elements were developed by wiping with a developer liquid comprising 0.5% by weight of sodium carbonate, 0.3% by weight of sodium silicate, 25% by weight of n-propanol and 74.2% by weight of water, baring the surface of bases (A) in the nonimage areas. In this way, the differentiation into hydrophilic and oleophilic areas typical of offset printing plates was obtained not only with the recording element according to the invention but also with the prior art recording element, the bared surface of bases (A) forming the hydrophilic areas.

Thereafter the two offset printing plates were rinsed with water, and the hydrophilic character of the bared surface of the base was further increased by wiping with dilute phosphoric acid.

After inking with an offset printing ink of the oil in water type, the two offset printing plates were employed for printing in an offset press.

In printing, the offset printing plate produced from the recording element according to the invention (Example 4) produced a long run of excellent printed copies which were completely faithful to the original and which were up to the highest quality standards, while the prior art offset printing plate only produced printed copies of moderate quality.

This shows that the advantages of modern exposure methods can be utilized in full by means of the electrophotographic recording element according to the invention.

EXAMPLE 5 AND COMPARISON C3

Two solutions were prepared, each comprising 1 g of poly(N-vinylcarbazole) in 8 g of tetrahydrofuran.

A solution of 0.02 g of naphtholactam dye I-16 in 1 g of ethylene glycol monoethyl ether was added to one of these solutions (Example 5), while the corresponding Rhodamine B solution was added to the other solution (Comparison C3).

The two resulting solutions were used in accordance with the general experimental method specified in connection with Examples 1 and 2 to prepare a recording element according to the invention and a prior art recording element by casting from solution, again on the abovementioned aluminum sheets.

The two recording elements were charged not only positively but also negatively and exposed with a xenon high pressure lamp emitting light of the wavelength $\lambda \geqq 590$ nm, and afterwards the resulting photodrop (PD) was measured.

For the positively charged recording element according to the invention this was found to be 79.3% and in the case of the negatively charged recording element according to the invention 73.6% (Example 5).

The corresponding values for the known recording element were 60.1% and 51.5% (Comparison C3), again documenting the superiority of the recording element according to the invention.

EXAMPLE 6 AND COMPARISON C4

Two solutions were prepared, each comprising 0.6 g of polycarbonate (®Markrolon 2800 from Bayer AG), 0.4 g of 2,5-bis(4'-diethylaminophen-1'-yl)-1,3,4-oxadiazole and 8 g of tetrahydrofuran.

The two solutions were processed as described in connection with Example 5 and Comparison C3 into a recording material according to the invention (Example 6) and a prior art recording material (Comparison C4). Recording elements of this kind are suitable in particular for the photocopying sector.

The two recording elements were tested in accordance with the directions of Example 5 and Comparison C4, revealing in the case of Example 6 a photodrop of 59.7% (following positive charging) and a photodrop of 56.4% (following negative charging) and in the case of Comparison C4 photodrops of 33.4% (following positive charging) and of 39.4% (following negative charging), these results further supporting the superiority of the recording element according to the invention.

EXAMPLES 7 TO 10 AND COMPARISONS C5 TO C8

The experimental method described in Example 6 and Comparison C4 was repeated to prepare and test four novel (Examples 7 to 10) and four prior art (Comparisons C5 to C8) electrophotographic recording elements using in this instance other photoconductors ($b_3$):

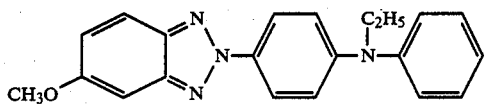

[= 2-(4'-N—ethyl-N—phenylaminophen-1'-yl)-5-methoxybenzotriazole] was used for Example 7 and Comparison C5,

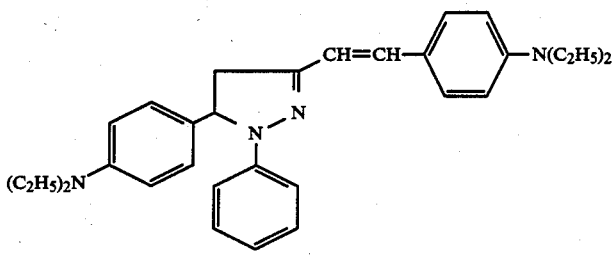

[= 1-phenyl-3-(4'-N,N—diethylamino-β-styryl)-5-(4'-N,N—diethylaminophen-1'-yl)-Δ$^2$-pyrazoline] was used for Example 8 and Comparison C6,

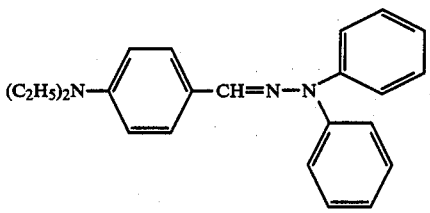

[= 4-N,N—diethylaminobenzaldehydediphenylhydrazone] was used for Example 9 and Comparison C7 and

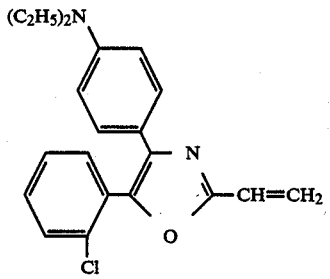

[= 2-vinyl-4-(4'-N,N—diethylaminophen-1'-yl)-5-(2'-chlorophen-1'-yl)-1,3-oxazole] was used for Example 10 and Comparison C8.

The experimental results summarized in Table 2 again document the superior action of naphtholactam dyes I.

TABLE 2

| | Photodrop (PD) (%) | |
|---|---|---|
| Examples and Comparisons | After positive charging | After negative charging |
| Ex. 7 | 38.5 | 41.6 |
| cf. Comp. C5 | 10.8 | 15.2 |
| Ex. 8 | 69.0 | 85.2 |
| cf. Comp. C6 | 22.7 | 50.3 |
| Ex. 9 | 56.9 | 70.0 |
| cf. Comp. C7 | 28.2 | 60.2 |
| Ex. 10 | 48.5 | 51.8 |
| cf. Comp. C8 | 19.3 | 21.1 |

The sensitizing action of naphtholactam dye I-16 to be used according to the invention in the presence of different photoconductors (b₃) compared with Rhodamine B

EXAMPLES 11 TO 24

Examples 1 and 2 were repeated, except that naphtholactam dyes I-16 and I-34 to be used according to the invention were replaced by naphtholactam dyes I-48 (Example 11), I-57 (Example 12), I-60 (Example 13), I-71 (Example 14), I-77 (Example 15), I-85 (Example 16), I-96 (Example 17), I-97 (Example 18), I-98 (Example 19), I-99 (Example 20), I-102 (Example 21), I-103 (Example 22), I-107 (Example 23) and I-115 (Example 24). In this way the sensitizing action not only of naphtholactam dyes I to be used according to the invention (Examples 14 to 24) but also of novel naphtholactam dyes I according to the invention (Examples 11 to 13) was tested under red and infrared light.

Table 3 gives an overview of the absorption maxima ($\lambda_{max}$) of the naphtholactam dyes I in question and of the thus induced photodrop (PD) in recording elements according to the invention following negative charging.

TABLE 3

The sensitizing action of naphtholactam dyes I according to the invention and to be used according to the invention on exposure with red and infrared light

| Example | Naphtholactam dye I | $\lambda_{max}$ (nm) | Photodrop (PD) (%) |
|---|---|---|---|
| 11 | I-48 | 598 | 93.3 |
| 12 | I-57 | 622 | 89.3 |
| 13 | I-60 | 626 | 85.0 |
| 14 | I-71 | 740, 840 | 85.1 |
| 15 | I-77 | 690, 765 | 73.2 |
| 16 | I-85 | 750, 860 | 79.6 |
| 17 | I-96 | 703, 770 | 78.6 |
| 18 | I-97 | 792, 878 | 83.5 |
| 19 | I-98 | 770, 850 | 31.5 |
| 20 | I-99 | 800, 890 | 25.6 |
| 21 | I-102 | 780, 875 | 30.5 |
| 22 | I-103 | 790, 890 | 23.3 |
| 23 | I-107 | 780, 875 | 21.5 |
| 24 | I-115 | 800, 840 | 14.1 |

The measurements obtained show that naphtholactam dyes I have in some instances an excellent sensitizer action in the infrared wavelength region. It is a surprising observation in this connection that there most certainly is a correlation between the sensitizer action and the absorption maximum ($\lambda_{max}$) of a naphtholactam dye I, but that this correlation alone is not pivotal for an excellent sensitizer action. There are evidently other, hitherto unexplained effects involved here, so that the selection of naphtholactam dyes I for this purpose simply be made by reference to their partly known range of physical properties.

EXAMPLES 25 TO 27

Examples 11 to 13 were repeated, except that for the exposure with the xenon high pressure lamp the high pass filter between the light source and recording element according to the invention was replaced by a conventional neutral filter of optical density OD = 1. The photodrop (PD) values given in Table 4 were measured here.

TABLE 4

The sensitizing action of naphtholactam dyes I according to the invention in recording elements according to the invention

| Example | Naphtholactam dyes I | Photodrop (PD) (%) |
|---|---|---|
| 25 | I-48 | 71.8 |
| 26 | I-57 | 60.2 |
| 27 | I-60 | 50.8 |

EXAMPLES 28 AND 29 AND COMPARISON C9

Example 4 was repeated, on one occasion using naphtholactam dye I-71 (Example 28) and on another occasion using naphtholactam dye I-97 (Example 29), in both cases the helium-neon laser of Example 4 being replaced by a GaAlAs semiconductor laser for the imagewise exposure of the recording elements according to the invention.

The offset printing plates thus produced had the same advantageous properties as those described in Example 4.

It was not possible to use the offset printing plate production method employed in Examples 28 and 29 with the known, Rhodamine B-containing recording element (Comparison C9).

EXAMPLE 30

The preparation of naphtholactam dye I-48 according to the invention; experimental method:

0.085 mol of N-ethylnaphtholactam (=general structure VIII with $R^1$=ethyl) was dissolved in 60 g of $POCl_3$ at 40° to 50° C. 0.1 mol of 4-phenyl-2,N,N-diethylamino-1,3-thiazole and 15 g of anhydrous $ZnCl_2$ were added to the resulting solution at room temperature under an inert gas a little at a time. Thereafter the reaction mixture was stirred at from 60° to 70° C. for 2 hours and then poured at room temperature into 500 ml of water.

The resulting aqueous phase was heated at the boil with stirring for 30 minutes. Thereafter the precipitate formed was separated from the aqueous phase by filtration, and 500 ml of saturated sodium chloride solution were added to the filtrate, and naphtholactam dye I-48 precipitated as a crystalline solid.

After the aqueous phase had been filtered off, naphtholactam dye I-48 was repeatedly washed with dilute sodium chloride solution and then dried.

The yield of dye was 25%, based on the naphtholactam of the structure IX. The elemental composition determined by chemical elemental analysis conformed to that calculated in theory. The absorption maximum of the dye was at $\lambda_{max}$=598 nm.

EXAMPLES 31 AND 32

The preparation of naphtholactam dyes I-57 and I-60 according to the invention; general experimental method:

0.025 mol of N-ethyl-5-N,N-dimethylaminosulfonylnaphtholactam (=general structure VIII with $R^1$=ethyl, $R^4$=N,N-dimethylaminosulfonyl and t=1) (Example 31) or 0.025 mol of N-ethyl-5-bromonaphtholactam (=general structure VIII with $R^1$=ethyl, $R^4$=bromine and t=1) (Example 32) was dissolved together with 2 g of anhydrous $ZnCl_2$ in each case in 10.5 g of $POCl_3$ in each case at room temperature.

The two resulting solutions were heated with stirring at 110° C. for 30 minutes and then cooled down to from 80° to 90° C. Thereafter a solution of 6.38 g of 4-phenyl-2-N,N-diethylamino-1,3-thiazole in 15 g of 1,2-dichloroethane was added dropwise to each of the two naphtholactam-containing solutions at from 80° to 90° C. in the course of one hour.

The two resulting reaction mixtures were subsequently refluxed for four hours with stirring, and then the two hot reaction mixtures were each added to 100 ml of hot water at 70° C.

The two resulting aqueous phases were heated to the reflux temperature, and 1,2-dichloroethane distilled off. Thereafter the two hot aqueous phases were each admixed with 50 ml of 50% strength aqueous sodium acetate solution and then cooled down, and naphtholactam dyes I-60 (Example 31) and I-57 (Example 32) precipitated as crystalline solids, which were easy to filter off, washed with water and dried.

The yield of dyes I-60 (Example 31) was 85% and that of dye I-57 (Example 32) was 42%, each based on the relevant naphtholactam of the general structure IX. The elemental composition of the two dyes determined by chemical elemental analysis was in agreement with the compositions theoretically calculated for each. The absorption maximum of dye I-60 was $\lambda_{max}=626$ nm and that of I-57 at $\lambda_{max}=622$ nm.

We claim:

1. An electrophotographic recording element comprising
   (A) an electrically conducting base and
   (B) at least one photoconductive layer consisting essentially of
      (b₁) at least one binder,
      (b₂) 0.5 to 20 parts by weight per 100 parts by weight of the binder (b₁) of at least one sensitizer which on exposure of layer (B) generates charge carriers and which is being selected from the group of the naphtholactam dyes of the general structure I

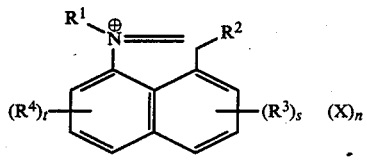

where the indices and variables are defined as follows:
$R^1$ is $C_1$–$C_{22}$-alkyl, $C_5$–$C_7$-cycloalkyl, $\omega$-aryl-$C_1$–$C_6$-alkyl, aryl or $C_3$–$C_{15}$-alkylene, or $R^1$ is halogen-, hydroxyl-, amino-, thiolo-, cyano-, oxyl-, alkyloxy-, cycloalkyloxy-, aryloxy-, arylalkyl-oxy-, alkylamino-, cycloalkylamino-, arylamino-, arylalkylamino-, alkane carbonyloxy-, cycloalkane-, carbonyloxy-, arylalkanecarbonyloxy-, aromatocarbonyloxy-, alkane carbonylamino-, cycloalkanecarbonylamino-, arylcarbonylamino-, aromatocarbonylamino-, alkyl-, ideneimino-, cycloalkylideneimino-, arylalkylideneimino-, carboxyl-, phosphono- and/or sulfo-substituted $C_1$–$C_{22}$-alkyl, $C_5$–$C_7$-cycloalkyl, $\omega$-aryl-$C_1$–$C_6$-alkyl, aryl or $C_3$–$C_{15}$-alkylene, or $R^1$ is a radical of the general formula II

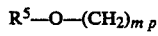

where $R^5$ is hydrogen, $C_1$–$C_6$-alkyl or $C_6$–$C_{10}$-aryl, m is an integer from 2 to 4 and independently thereof p is an integer from 1 to 10, $R^2$ is a radical of the general formula 111

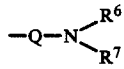

where $R^6$ and $R^7$ are identical to or different from each other and are each hydrogen, $R^1$ or alkyl alkan-1-yl-$\omega$-carboxylate and where Q is 1, 4-phenylene, 2-alkyl-1, 4-phenylene or 1, 4-naphthylene, or $R^2$ is a radical of the general formula IV

where $R^8$ is a substituted or unsubstituted, mono cyclic or fused heterocycle from the class of the azoles, azolines, azolimines, partially or completely hydrogenated azoles and partially or completely hydrogenated azepines which is bonded to Q via a nitrogen ring atom and where Q is as defined for the general formula III, or $R^2$ is a substituted or unsubstituted, monocyclic or fused heterocycle from the class of the azoles, azolines, partially hydrogenated azines and azines which is bonded to the naphtholactam structure via a carbon ring atom, or $R^2$ is a radical of the general formula V

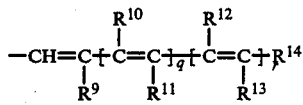

where the indices and variables are defined as follows:
q is 0 or 1,
r is independently of q 0, 1 or 2,
$R^9$ and $R^{11}$ are each hydrogen or, if q is 1, together an unsubstituted or $C_1$–$C_4$-alkyl-substituted $C_2$–$C_3$-alkanediyl chain or one or two carbonyl groups, $R^{10}$, are each hydrogen, halogen, oxygen, cyano, nitro, hydroxyl, $R^{12}$ and $R^{13}$ $R^1$, $C_5$–$C_7$-alkoxy, $C_5$–$C_7$-cycloalkoxy, $C_6$–$C_{10}$-aryloxy, $\omega$-phenyl-$C_1$–$C_6$-alkyloxy, $C_1$–$C_6$-alkoxycarbonyl, $C_5$–$C_7$-cycloalkyloxycarbonyl, $C_6$–$C_{10}$-aryloxycarbonyl, $\omega$-phenyl-$C_1$–$C_6$-alkyloxycarbonyl, $C_1$–$C_6$-alkylaminocarbonyl, $C_5$–$C_7$-cycloalkylaminocarbonyl, $C_6$–$C_{10}$-arylaminocarbonyl, $\omega$-phenyl-$C_1$–$C_6$-alkylaminocarbonyl or a substituted or unsubstituted, monocyclic or fused heterocycle from the class of the azoles, azolines, azines and partially hydrogenated azines, $R^{10}$, $R^{12}$ and $R^{13}$ being identical or different from one another, $R^{14}$ is $R^2$ of the general formula III,
$R^{14}$ is $R^2$ of the general formula IV,
$R^{14}$ is a substituted or unsubstituted, monocyclic or fused heterocycle from the class of the azoles, thiols, azolines, azolidines, azines, partially or completely hydrogenated azines and thiines which is bonded to the radical of the general formula v via a carbon ring atom, or $R^{14}$ is a radical of the general formula VI

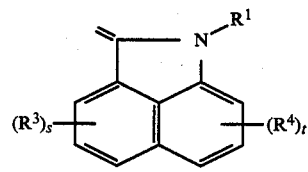

where $R^1$ is as defined above and where $R^3$, $R^4$, s and t are each as defined below, or
$R^2$ is a radical of the general formula VII

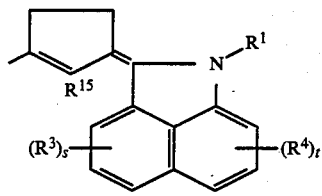

VII where $R^1$ is as defined above, $R^3$, $R^4$, s and t are each as defined below and where $R^{15}$ is the radical
of an acidic CH compound,
s is 1, 2 or 3,
t is independently of s 1, 2 or 3,
$R^3$ and $R^4$ are each $R^{10}$, $R^{12}$, $R^{13}$, $R^1$, carboxyl, sulfo, and phosphono, $C_1$–$C_6$-alkyl-, $C_5$–$C_7$-cycloalkyl-, $C_6$–$C_{10}$-aryl- or ω-phenyl-$C_1$–$C_6$-alkyl-thio, -oxysulfonyl, -sulfonyl or -oxycarbonylaminyl, N,N-dialkyl-, N, N-diaryl-, N-alkyl-N-aryl-, N,N-di-(ω-arylalkyl)-, N-alkyl-N-(ω-arylalkyl)-, N-aryl-N (ω-arylalkyl)-, N,N-dicycloalkyl-, N-cycloalkyl-N-alkyl-, N-cycloalkyl-N-aryl- or N-cycloalkyl-N (ω-arylalkyl)-amino, -aminosulfonyl or -aminocarbonyl or if
s=2 or 3,
t=2 or 3 or
s and t=1, 2 or 3
a carbon, nitrogen, oxygen or sulfur atom which is part of the structure of one or more rings fused to the naphth-1, 8-ylene group, $R^3$ and $R^4$ being identical to or different from each other,
X is an anion,
and
n is 0 or $\frac{1}{3}$, $\frac{1}{2}$, $\frac{2}{3}$, 1, 2 or 3; and
(b3) at least one photoconductor which transports the generated charge carriers.

2. The electrophotographic recording element defined in claim 1, wherein layer (B) is a double layer consisting of a naphtholactam dye I-containing sensitizer layer (b2) and a layer containing binders (b1) and photoconductors (b3).

3. The electrophotographic recording element defined in claim 2, wherein layer (B) has been constructed as a double layer containing a sensitizer layer (b2) of naphtholactam dyes I.

4. The electrophotographic recording element defined in claim 1, wherein a further sensitizer layer of a pigment known per se is situated between the base (A) and the layer (B).

5. The electrophotographic recording element defined in claim 1, wherein a further photoconductive layer of a photoconductor known per se is situated on the base (A).

6. The electrophotographic recording element defined in claim 1 for producing a printing plate, containing a base (A) from 80 μm to 0.6 mm in thickness suitable for printing plates and at least one layer (B).

7. The electrophotographic recording element defined in claim 6, wherein binders (b1) of layer(s) (B) are soluble or swellable in aqueous alkaline or aqueous alcoholic developer solvents.

8. The electrophotographic recording element defined in claim 7, wherein binder (b1) is a copolymer of styrene, maleic anhydride and acrylic acid and/or methacrylic acid, which contains in copolymerized form and based on its total amount from 5 to 50% by weight of maleic anhydride and from 5 to 35% by weight of acrylic acid and/or meth-acrylic acid.

9. A process for preparing an offset printing plate from an electrophotographic recording element, comprising the following steps in the given order:
(1) charging an electrophotographic recording element with an electrically positive or electrically negative charge by means of a high-voltage corona, said electrophotographic recording element comprising
(A) an electrically conducting base and
(B) at least one photoconductive layer consisting essentially of
(b1) at least one binder,
(b2) 0.5 to 20 parts by weight per 100 parts by weight of the binder (b1) of at least one sensitizer which on exposure of layer (B) generates charge carriers and which is selected from the group of the naphtholactam dyes,
(b3) at least one photoconductor which transports the generated charge carriers and optionally
(b4) additives,
(2) subjecting the electrically negatively or electrically positively charged electrophotographic recording element to imagewise exposure with red or infrared light to produce a latent electrostatic charge image,
(3) developing the latent electrostatic charge image by means of a solid or liquid toner to produce a toner image,
(4) fixing the tonered image by heating and
(5) washing away the untonered nonimage areas of the photoconductive layer (B) of the electrophotographic recording element with a developer solvent to bare the hydrophilic surface of the base (A).

10. The process for preparing an offset printing plate defined in claim 9, wherein a semiconductor laser is used as the light source of the imagewise exposure (step 2).

11. A process for preparing a photoresist from an electrophotographic recording element on a surface to be etched and/or electroplated, comprising the following steps in the given order:
(1) charging an electrophotographic recording element with an electrically positive or electrically negative charge by means of a high-voltage corona, said electrophotographic recording element comprising
(A) an electrically conducting base and
(B) at least one photoconductive layer consisting essentially of
(b1) at least one binder,
(b2) 0.5 to 20 parts by weight per 100 parts by weight of the binder (b1) of at least one sensitizer which on exposure of layer (B) generates charge carriers and which is selected from the group of the naphtholactam dyes,
(b3) at least one photoconductor which transports the generated charge carriers and optionally
(b4) additives,
(2) subjecting the electrically negatively or electrically positively charged electrophotographic recording element to imagewise exposure with red or infrared light to produce a latent electrostatic charge image, (3) developing the latent electrostatic charge image by means of a solid or liquid toner to produce a toner image, (4) fixing the tonered image by heating and (5) washing away the untonered nonimage areas of the photoconductive layer (B) of the electrophotographic recording element with a developer solvent to bare the surface of base (A) to be etched and/or electroplated.

12. The process for preparing a photoresist defined in claim 11, wherein a semiconductor laser used as the light source for the imagewise exposure (step 2).

13. A reprographic process for preparing a photocopy by means of an electrophotographic recording element, comprising the following steps in the given order:

(1.) charging an electrophotographic recording element with an electrically positive or electrically negative charge by means of a high-voltage corona, said electrophotographic recording element comprising (A) an electrically conducting base and (B) at least one photoconductive layer consisting essentially of (b$_1$) at least one binder, (b$_2$) 0.5 to 20 parts by weight per 100 weight of the binder (b$_1$) of at least one sensitizer which on exposure of layer (B) generates charge carriers and which is selected from the group of the naphtholactam dyes, (b$_3$) at least one photoconductor which transports the generated charge carriers and optionally (b$_4$) additives, (2) subjecting the electrically negatively or electrically positively charged electrophotographic recording element to imagewise exposure with red or infrared light to produce a latent electrostatic charge image, (3) developing the latent electrostatic charge image by means of a solid or liquid toner to produce a toner image, (4) transferring the toner image to another surface and (5) fixing the transferred toner image on the other surface.

14. The reprographic process defined in claim 13, wherein a semiconductor laser is used as the light source for the imagewise exposure (step 2).

15. A naphtholactam dye of the structure I

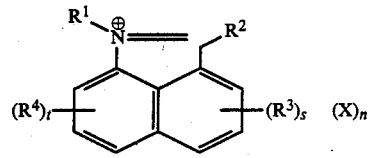

wherein the variables $R^1$, $R^3$, $R^4$ and X and the indices t, s and n are as defined in claim 1 and wherein $R^2$ is substituted monocyclic 1,3-thiazolyl bonded to the naphtholactam structure via a carbon ring atom.

16. A naphtholactam dye as defined in claim 15, wherein the substituted 1,3-thiazolyl is 4-aryl-2-N,N-dialkylamino-, 4-aryl-2-N,N-dicycloalkylamino-, 4-aryl-2-N-alkyl-N-cycloalkylamino-, 4-aryl-2-N,N-diarylamino-, 4-aryl-2-N-alkyl-N-alkyl-arylamino-, 4-aryl-2-N-cycloalkyl-N-arylamino-, 4-aryl-2-N,N-di(ω-arylalkyl)amino-, 4-aryl-2-N-alkyl-N-(ω-arylalkyl)amino-, -aryl-2-N-(ω-arylalkyl)-N-arylamino-, 4-aryl-2-N-(ω-arylalkyl)-N-cycloalkylamino-,4-aryl-2-(azolidin-1'-yl)-, 4-aryl-2-(azolin-1'-yl)-, 4-aryl-2- (azol-1'-yl)- or 4-aryl-2-(perhydroazin-1'-yl)-1,3-thiazol-5-yl.

17. A naphtholactam dye as defined in claim 16, wherein aryl is phenyl.

18. A naphtholactam dye as defined in claim 16, wherein N,N-dialkylamino is N,N-diethylamino.

19. A naphtholactam dye as defined in claim 15, wherein X is tetrachlorozincate and n is ½.

* * * * *

UNITED STATES PATENT AND TRADEMARK OFFICE
CERTIFICATE OF CORRECTION

PATENT NO.   : 4,906,541
DATED        : March 6, 1990
INVENTOR(S)  : Matthias DUST et al.

It is certified that error appears in the above-identified patent and that said Letters Patent is hereby corrected as shown below:

Claim 1, column 43, line 65

"azolimines" should read --azolidines--

Claim 1, column 44, line 28

$C_5-C_7$-alkoxy" should read --$C_1-C_6$-alkoxy--

Claim 16, column 48, line 32 that part of line 32 reading ")amino-,-aryl-" should read --)amino-, 4-aryl----

Signed and Sealed this

Thirteenth Day of August, 1991

Attest:

HARRY F. MANBECK, JR.

Attesting Officer          Commissioner of Patents and Trademarks